(12) United States Patent
Arima et al.

(10) Patent No.: US 11,550,526 B2
(45) Date of Patent: Jan. 10, 2023

(54) IMAGE FORMING SYSTEM THAT SUITABLY CARRIES OUT COMMUNICATION USING MOBILE COMMUNICATION SYSTEM, CONTROL METHOD THEREFOR, AND STORAGE MEDIUM

(71) Applicant: CANON KABUSHIKI KAISHA, Tokyo (JP)

(72) Inventors: Makoto Arima, Chiba (JP); Ryohei Yamada, Chiba (JP); Kazuhiro Oyoshi, Chiba (JP); Yoshikazu Sato, Chiba (JP); Mizuki Wakabayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/500,097

(22) Filed: Oct. 13, 2021

(65) Prior Publication Data
US 2022/0121407 A1 Apr. 21, 2022

(30) Foreign Application Priority Data
Oct. 21, 2020 (JP) .............................. JP2020-176689

(51) Int. Cl.
*G06F 3/12* (2006.01)
(52) U.S. Cl.
CPC .......... *G06F 3/1292* (2013.01); *G06F 3/1222* (2013.01); *G06F 3/1238* (2013.01)
(58) Field of Classification Search
CPC ..... G06F 3/1292; G06F 3/1222; G06F 3/1238
USPC ....................................................... 358/1.14
See application file for complete search history.

(56) References Cited

U.S. PATENT DOCUMENTS

| | | | | |
|---|---|---|---|---|
| 7,881,988 B2* | 2/2011 | Otani | ................... | G06Q 10/087 705/28 |
| 8,482,751 B2* | 7/2013 | Alverson | ........... | H04N 1/00875 358/1.14 |
| 8,749,816 B2* | 6/2014 | Sunada | .................. | B41J 29/393 358/401 |

(Continued)

FOREIGN PATENT DOCUMENTS

| JP | 2005045384 A | 2/2005 |
|---|---|---|
| JP | 2006121336 A | 5/2006 |

(Continued)

*Primary Examiner* — Allen H Nguyen
(74) *Attorney, Agent, or Firm* — Rossi, Kimms & McDowell LLP

(57) ABSTRACT

An image forming system that is capable of causing an image forming apparatus to suitably carry out communication using a mobile communication system, the image forming system including an image processing apparatus and an image forming apparatus. Control information used to carry out an image forming process in which an image is formed on a sheet based on image data generated by an image processing apparatus is output from first and second millimeter wave communication interfaces of the image processing apparatus. The output control information is received by third and fourth millimeter wave communication interfaces of the image forming apparatus. Response information that is a response to the control information is output from the third and fourth millimeter wave communication interfaces and sent to the image processing apparatus.

20 Claims, 24 Drawing Sheets

(56) References Cited

U.S. PATENT DOCUMENTS

| | | | |
|---|---|---|---|
| 10,263,652 B2* | 4/2019 | Perumana | H01L 23/66 |
| 10,559,971 B2* | 2/2020 | Zeine | H02J 50/10 |
| 2017/0006596 A1 | 1/2017 | Adachi | |
| 2018/0176776 A1* | 6/2018 | Knaappila | H04W 76/14 |
| 2019/0089066 A1* | 3/2019 | Lee | H01Q 19/10 |

FOREIGN PATENT DOCUMENTS

| | | |
|---|---|---|
| JP | 2017513328 A | 5/2017 |
| JP | 2017118557 A | 6/2017 |
| JP | 2019021978 A | 2/2019 |

\* cited by examiner

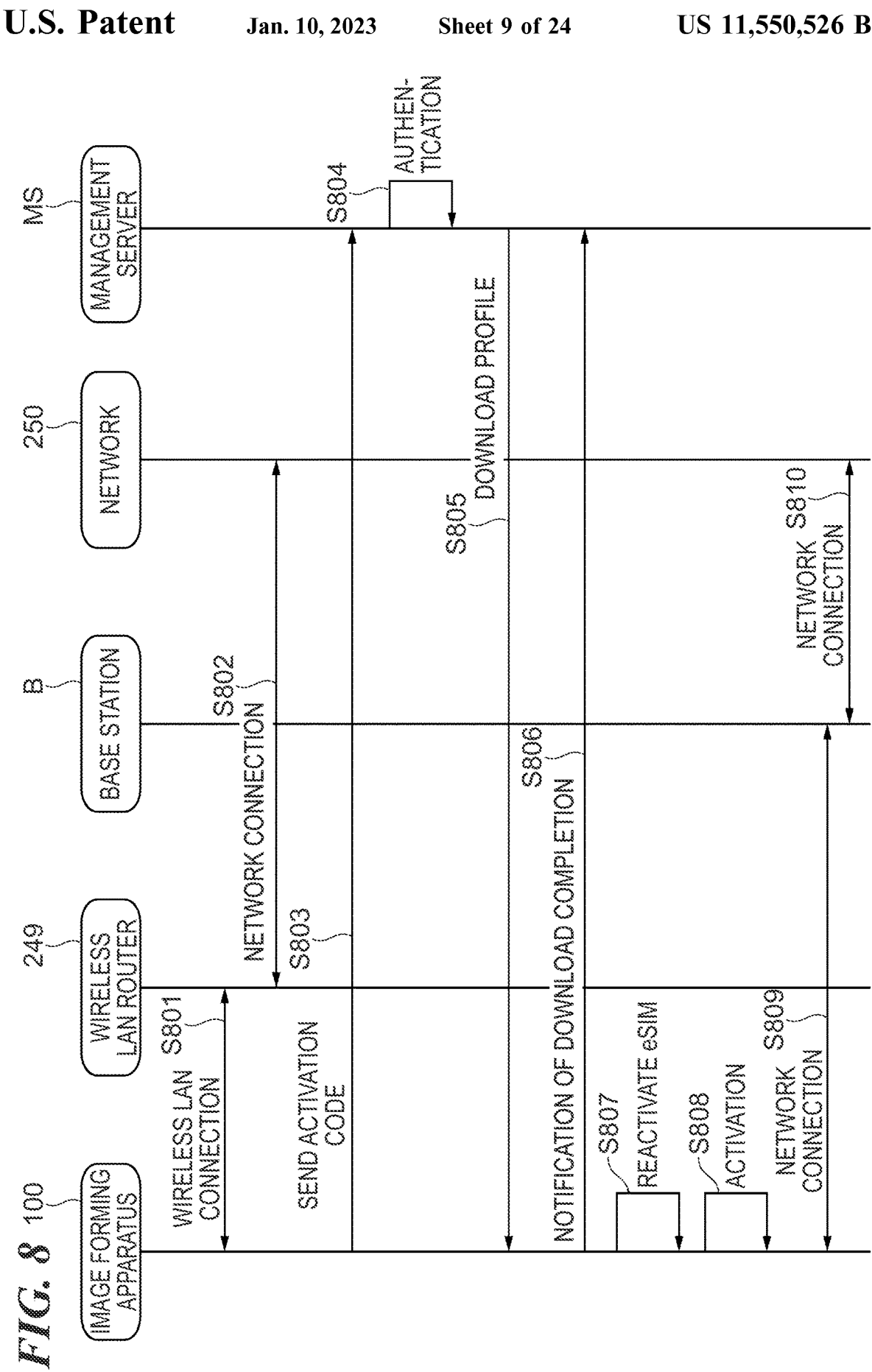

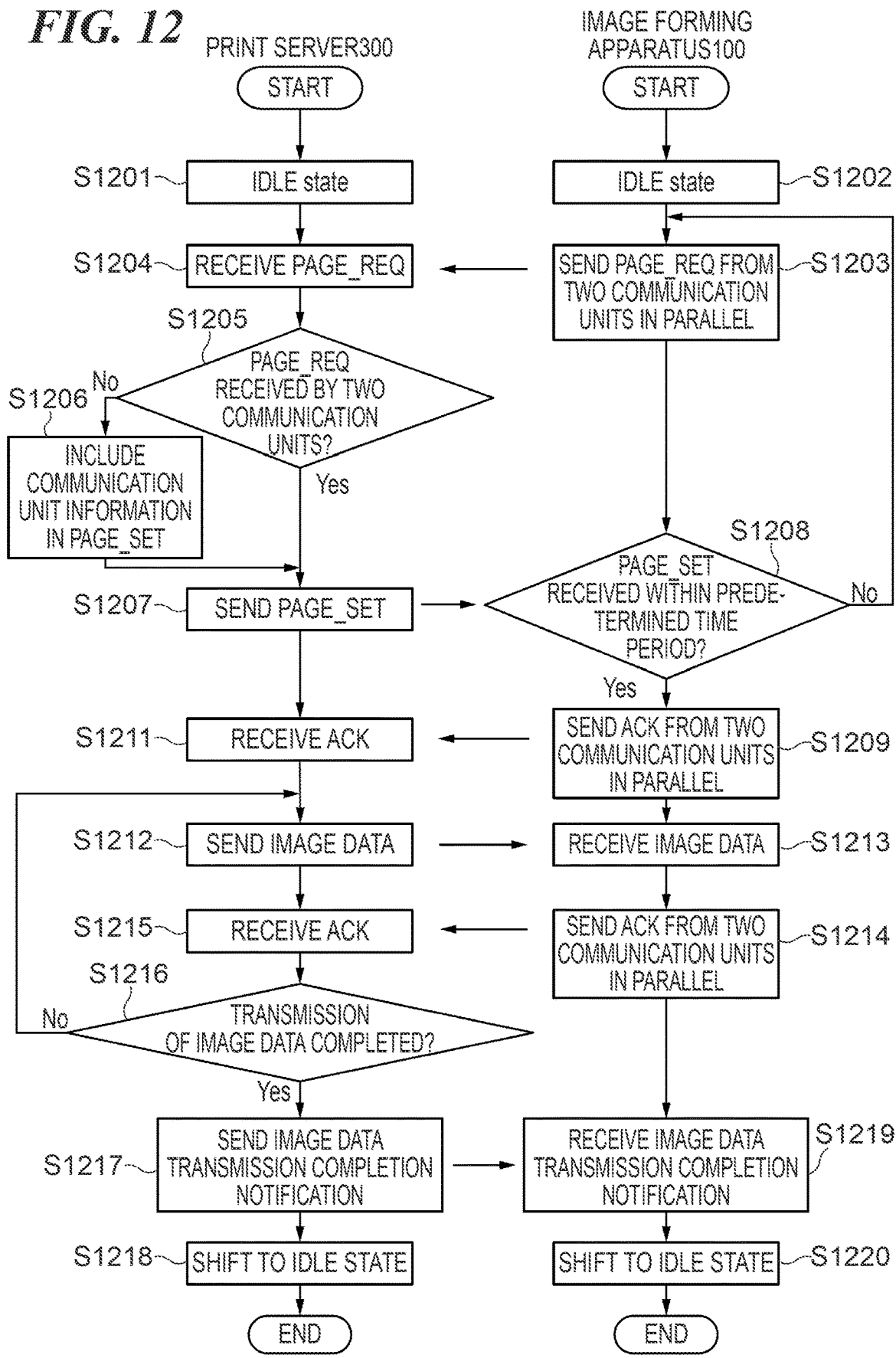

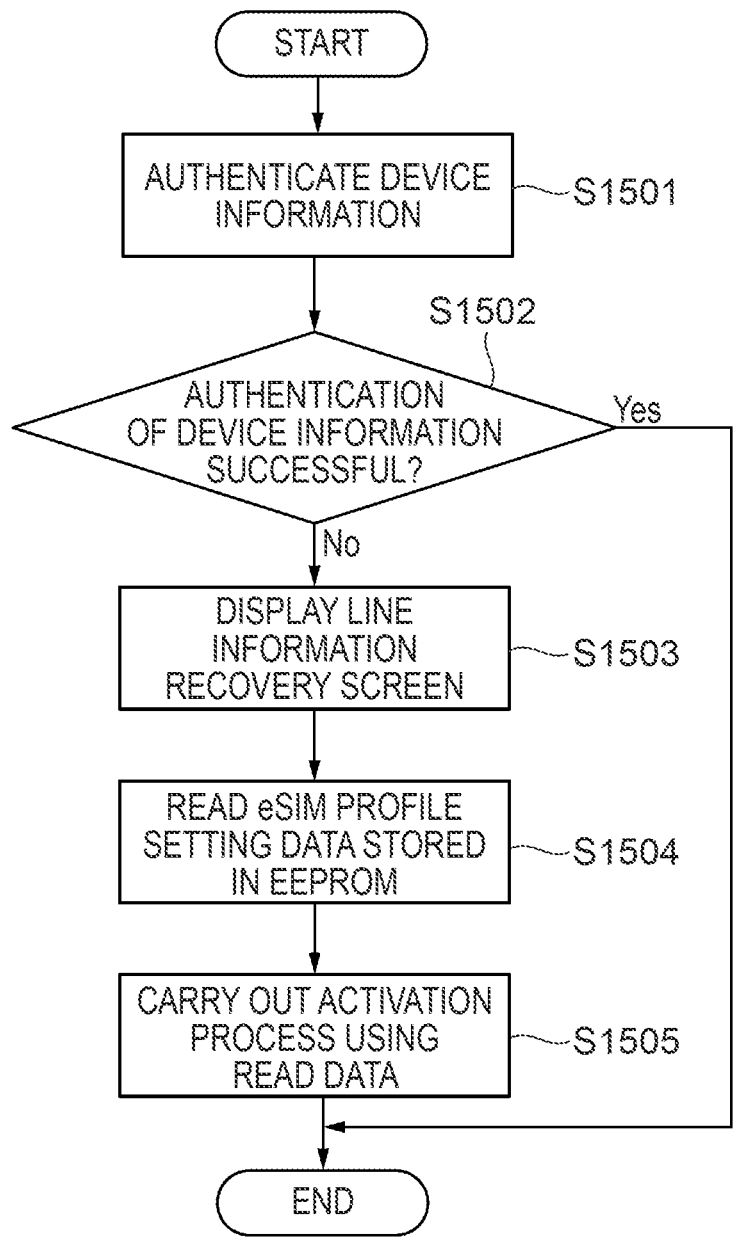

IMAGE FORMING SYSTEM THAT SUITABLY CARRIES OUT COMMUNICATION USING MOBILE COMMUNICATION SYSTEM, CONTROL METHOD THEREFOR, AND STORAGE MEDIUM

BACKGROUND OF THE INVENTION

Field of the Invention

The present invention relates to an image forming system that suitably carries out communication using a mobile communication system, a control method therefor, and a storage medium.

Description of the Related Art

Image forming apparatuses have a function of communicating various types of data such as print data and scan data. Recent image forming apparatuses communicate an increasing amount of data due to improved image quality or the like. Moreover, the 5th Generation Mobile Communication System (hereafter referred to as 5G) has been used lately as a standard for high-speed large-volume data communication. As an example of techniques related to a mobile communication system, a technique is proposed in Japanese Laid-Open Patent Publication (Kokai) No. 2006-121336. According to the technique described in Japanese Laid-Open Patent Publication (Kokai) No. 2006-121336, authentication of identification information about a subscriber of a cell phone is performed using a SIM card (USIM card) conforming to the IMT-2000 standard.

To carry out data communication using 5G, it is necessary to design an image forming apparatus suitable for 5G communication. In 5G communication, for example, wireless communication is carried out using high-frequency radio waves called millimeter waves. Although the millimeter waves are capable of carrying out high-speed large-volume communication since they are high-frequency radio waves, they have disadvantages of having high linearity and being weak to obstacles. In many cases, the image forming apparatus is placed in an office environment in which there are many people crossing, and in such an environment, there is the possibility that communication is temporarily disconnected. In 5G communication, authentication of a device is performed using a SIM (Subscriber Identity Module), and hence actions such as input of an address and an activation code are required so as to enable use of the device. This causes complication of a procedure related to authentication. Furthermore, for communication using 5G, it is necessary to take measures so as to improve security in performing authentication using SIM. The problems described above may also occur in communication using mobile communication systems other than 5G.

SUMMARY OF THE INVENTION

The present invention provides an image forming system that enables an image forming apparatus to suitably carry out communication using a mobile communication system, a control method therefor, and a storage medium.

Accordingly, the present invention provides an image forming system including an image processing apparatus and an image forming apparatus, comprising a memory device that stores a set of instructions, and at least one processor that executes the set of instructions, the image processing apparatus comprising a first controller, a first millimeter wave communication interface, and a second millimeter wave communication interface, and the image forming apparatus comprising a second controller, a third millimeter wave communication interface, and a fourth millimeter wave communication interface, wherein the first controller outputs control information, which is used to carry out an image forming process in which the image forming apparatus forms an image on a sheet based on image data generated by the image processing apparatus, from the first millimeter wave communication interface and the second millimeter wave communication interface, and the second controller receives the output control information via the third millimeter wave communication interface and the fourth millimeter wave communication interface, and outputs response information, which is a response to the received control information, from the third millimeter wave communication interface and the fourth millimeter wave communication interface, and sends the response information to the image processing apparatus.

The present invention enables the image forming apparatus to suitably carry out communication using the mobile communication system.

Further features of the present invention will become apparent from the following description of exemplary embodiments (with reference to the attached drawings).

BRIEF DESCRIPTION OF THE DRAWINGS

FIG. 8 is a sequence diagram showing an example of a flow of authentication performed in a mobile communication system using eSIM.

FIG. 12 is a sequence diagram showing an example of a flow of a process in which a control signal and image data are communicated between the image forming apparatus and the print server.

FIG. 15 is a flowchart showing an example of a flow of a process carried out at the start of the image forming apparatus in a case where the control board has been replaced.

FIG. 21 is a flowchart showing an example of a flow of a warning process carried out with the power on.

DESCRIPTION OF THE EMBODIMENTS

The present invention will now be described in detail with reference to the accompanying drawings showing embodiments thereof.

Figure 1:
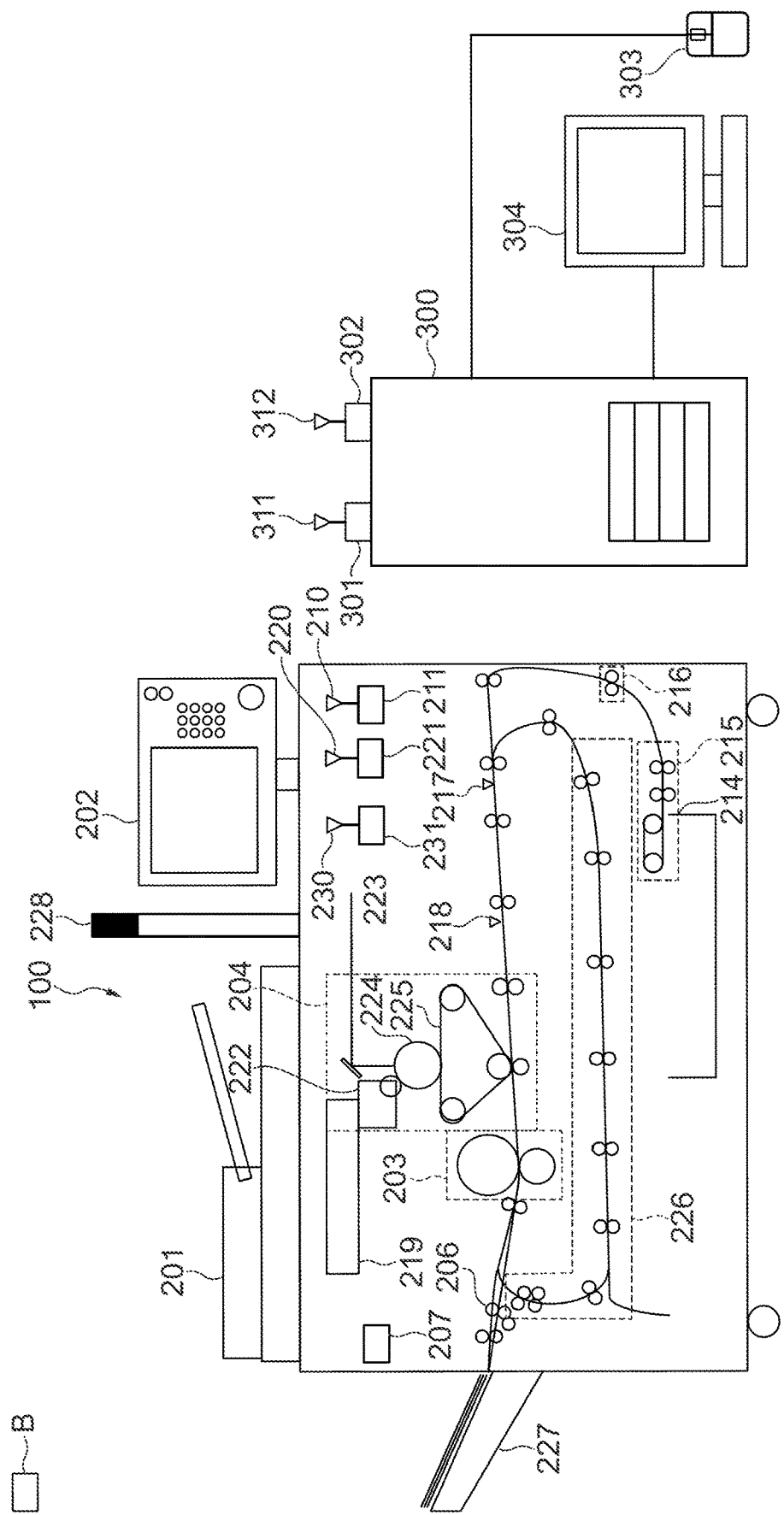
FIG. 1 is a view showing an example of a system including an image forming apparatus.
Figure 2:
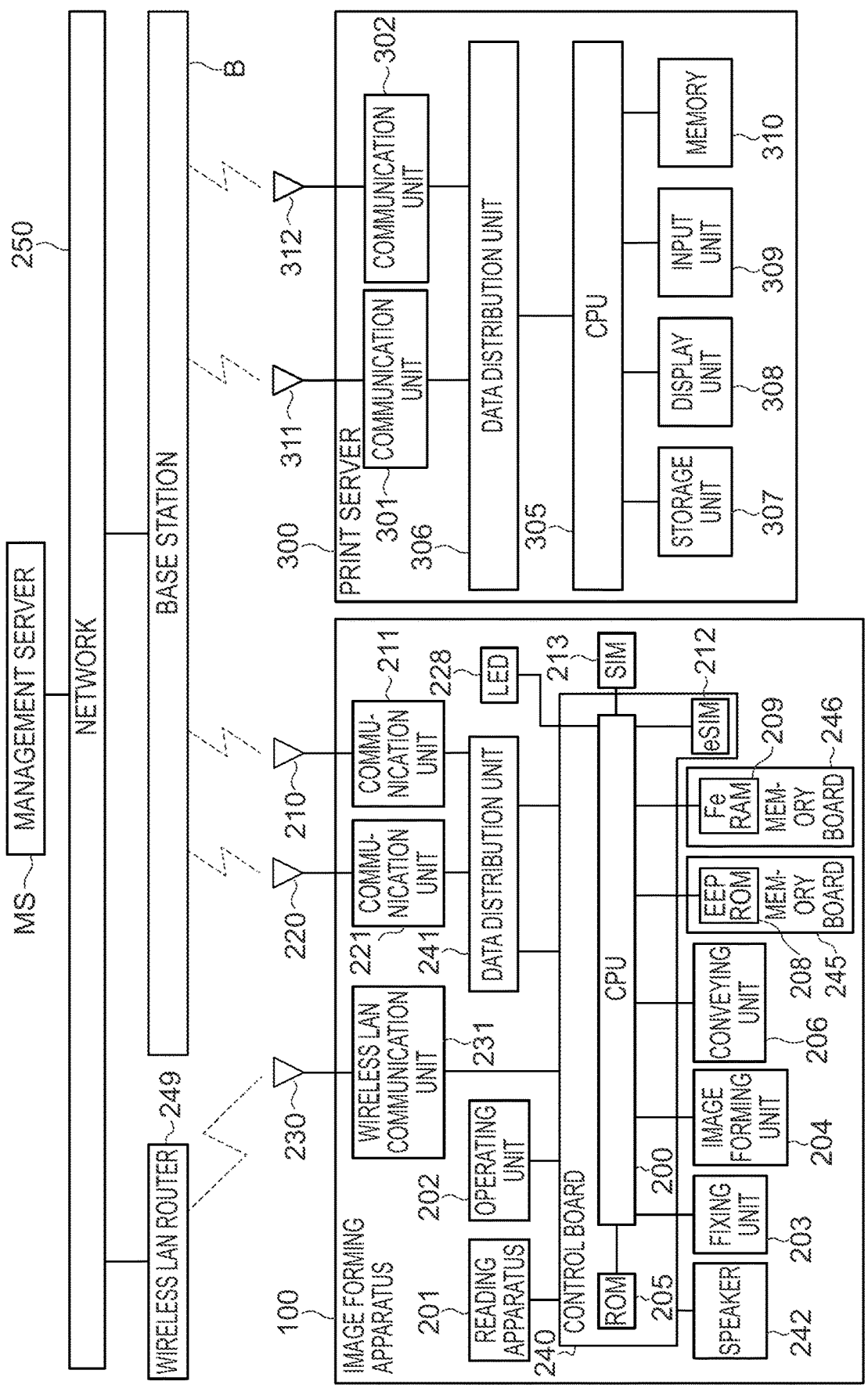
FIG. 2 is a view showing an example of an arrangement of the image forming apparatus and a print server.

A description will now be given of a first embodiment. FIG. 1 is a view showing an example of a system including an image forming apparatus 100 (image processing apparatus). The system in FIG. 1 includes the image forming apparatus 100 and a print server 300. This system includes a base station B and a wireless LAN router 249 (FIG. 2). The base station B, the wireless LAN router 249, and a management server MS (FIG. 2) are connected to a network 250. First, a description will be given of the image forming apparatus 100. The image forming apparatus 100 has a reading apparatus 201 and an operating unit 202. The reading apparatus 201 is a reader scanner, which reads an image printed on a sheet, an image on a screen displayed on a mobile terminal, and so forth, and corresponds to a reading device. The operating unit 202 receives inputs from a user and displays information presented to the user. The image forming apparatus 100 forms images on sheets based on process settings for sheets configured by the operating unit 202, an external host PC, or the like according to user operations, as well as image data transmitted by the reading apparatus 201, the external host PC, and so forth.

The image forming apparatus 100 has antennas 210 and 220. A communication unit 211 is connected to the antenna 210, and a communication unit 221 is connected to the antenna 220. The communication units 211 and 221 carry out wireless communications using a mobile communication system. The communication units 211 and 221 and/or the antennas 210 and 220 correspond to millimeter wave communication interfaces. It should be noted that the mobile communication system in each embodiment is the 5th generation mobile communication system. In the following description, wireless communication using the 5th generation mobile communication system is referred to as "5G communication". The image forming apparatus 100 sends and receives image data, control signals which are used to control communication of the image data, and so forth via communication conforming to the communication standard for the 5th generation mobile communication system. The image forming apparatus 100 may carry out wireless communications conforming to such standards as LTE (Long Term Evolution) or carry out wireless communications conforming to mobile communication systems after the 5th generation mobile communication system. Both the number of communication units and the number of antennas may be three or more.

The image forming apparatus 100 has a wireless LAN communication unit 231 that carries out wireless LAN communication using an antenna 230 for wireless LAN communication. The antenna 230 carries out wireless LAN communication with a wireless LAN router 249, which will be described later. An arbitrary method may be used as a method for wireless LAN communication. The image forming apparatus 100 is also equipped with an LED 228 for issuing a warning.

The image forming apparatus 100 has a sheet feeding unit 214, a fed sheet conveying unit 215 and a sheet feeding/conveying unit 216, which convey fed sheets. The fed sheet conveying unit 215, which is provided in the sheet feeding unit 214, separates sheets and feeds and conveys them one by one. The conveyed sheets continued to be conveyed by the sheet feeding/conveying unit 216. A stepping motor for conveyance is provided in each conveying unit. When each stepping motor is controlled to run, operation of the stepping motor provided in each conveying unit is mechanically transmitted. As a result, conveying rollers in each conveying unit rotate to convey sheets. An image forming unit 204 receives sheets one by one from the sheet feeding/conveying unit 216 and forms images based on setting information such as basis weight data and image quality received by the operating unit 202. When image forming conditions have been changed, the image forming unit 204 forms images on sheets according to the changed image forming conditions. The conveyance of sheets is controlled by each conveying unit. When a registration sensor 217 detects a sheet, the image forming unit 204 starts an image forming operation based on received image data.

Turning-on and control of light quantity of a semiconductor laser in a laser scanner unit 223 are performed, and a scanner motor that controls to rotate a polygon mirror is controlled as well, causing laser light, which is controlled according to image data, to form a latent image on a photosensitive drum 224. Then, toner is fed from a toner bottle 219 and is caused to develop the latent image on the photosensitive drum 224 by a developing unit 222. The developed toner image is transferred to an intermediate transfer belt 225 by the photosensitive drum 224 (primary transfer). The toner image primarily transferred onto the intermediate transfer belt 225 is transferred onto a sheet (secondary transfer) to form a toner image on a sheet. An image reference sensor 218 detects a position of a leading end of the sheet, and the position of the leading end is corrected. After the secondary transfer, the sheet is conveyed to a fixing unit 203. The fixing unit 203 applies heat and pressure to the sheet, melts the tone, and fixes the melted toner to the sheet. After the melted toner being fixed, an image is continuously formed on the other side of the sheet to which the toner has been fixed, or the sheet to which the toner has been fixed is output as a print result onto a sheet discharge tray 227 sequentially. Thus, the print result obtained by forming the image on the sheet (paper) is provided to the user. It should be noted that when it is necessary to invert the sheet after fixing the toner, the sheet is conveyed to an inverting conveyance unit 226.

A description will now be given of the print server 300. The image forming apparatus 100 sends and receives image data, control signals, and so forth to and from the print server 300 via 5G communication. The print server 300 has various functions such as accurate color adjustment and usability. By using the functions of the print server 300, the image forming apparatus 100 can improve image quality and productivity of printed matter obtained by the image forming apparatus 100. Conventionally, an arrangement in which the image forming apparatus 100 and the print server 300 are connected together by a wired cable has been adopted, whereas in each embodiment, 5G communication is carried out between the image forming apparatus 100 and the print server 300. The print server 300 has antennas 311 and 312. A communication unit 301 is connected to the antenna 311. A communication unit 302 is connected to the antenna 312. The communication units 301 and 302 carry out 5G communication as with the communication units 211 and 221 of the image forming apparatus 100. The communication units 301 and 302 and/or the antennas 311 and 312 correspond to millimeter wave communication interfaces. A display device 304 such as a display and an input device 303 such as a mouse are connected to the print server 300. It should be noted that both the number of communication units and the number of antennas in the print server 300 may be one or three or more.

FIG. 2 is a view showing an example of an arrangement of the image forming apparatus 100 and the print server 300. For the arrangement in FIG. 2, description of components described above with reference to FIG. 1 is omitted. The image forming apparatus 100 has a control board 240. A CPU 200, a ROM 205, and an eSIM module 212 are mounted on the control board 240. Various types of programs are stored in the ROM 205. The CPU 200, which is a first controller, executes the programs stored in the ROM 205. As a result, control is implemented in each embodiment. The reading apparatus 201, the operating unit 202, the fixing unit 203, the image forming unit 204, the conveying unit 206, a SIM connector 213, the LED 228, a data distribution unit 241, and a speaker 242 are connected to the control board 240. Memory boards 245 and 246 are also connected to the control board 240.

The eSIM module 212 is a module that stores a profile such as an IMSI (International Mobile Subscriber Identity) and a communication cryptgraphic private key. The IMSI is an identification number that is uniquely assigned to a device (image forming apparatus) that uses a mobile communication system. In FIG. 2, it is denoted by "eSIM", which is short for "Embedded SIM". The eSIM stores a profile, which is connection information for use in connecting to a mobile communication system, and is capable of connecting to the mobile communication system according to the stored profile. The mobile communication system may be a private or local network or may be a network operated by a mobile network operator. For example, a local mobile communication system is operated by a radio operator in a company or the like. The profile stored in the eSIM module 212 is rewritable from the management server MS for the mobile communication system. Once the profile stored in the eSIM module 212 is rewritten, it becomes possible to use a different local or private mobile communication system or a mobile communication system operated by a different mobile network operator.

The SIM connector 213 is a connector for connecting a removable SIM card on which a profile such as an ISMI and a communication cryptgraphic private key is stored. When the SIM card (or referred to merely as "the card") is inserted into the SIM connector 213, it becomes possible to connect to a mobile communication system determined according to the stored profile, as with eSIM. However, as is distinct from the case of the eSIM, the profile stored in the SIM card connected to the SIM connector 213 cannot be rewritten by a radio operator in a local or private mobile communication system or a mobile network operator. In each embodiment, it is assumed that the profile stored in the SIM card and the profile stored in the eSIM module 212 are the same, but they may be different.

The data distribution unit 241 is connected to the communication units 211 and 221. The data distribution unit 241 distributes control signals for communication, image data, and so forth to the communication units 211 and 221 under the control of the CPU 200. Namely, the same information is input to both of the communication units 211 and 221. The speaker 242 uses sound to provide notification to the user who is using the image forming apparatus 100. The memory board 245 is a module board on which an EEPROM (Electrically Erasable Programmable Read-Only Memory) 208 is mounted. The control board 240 and the memory board 245 are physically different boards. The EEPROM 208 and the CPU 200 are connected together via a universal interface such as I2C or SPI. The CPU 200 is capable of reading and writing data from and to the EEPROM 208.

The memory board 246 is a module board on which an FeRAM (Ferroelectric Random Access Memory) 209, which is a nonvolatile memory, is mounted. The control board 240 and the memory board 246 are physically different boards. The FeRAM 209 and the CPU 200 are connected together via a universal interface such as I2C or SPI. The CPU 200 is capable of reading and writing data from and to the FeRAM 209. Nonvolatile memories mounted on the memory boards 245 and 256 are not limited to EEPROM and FeRAM. The image forming apparatus 100 may be configured to have, as a nonvolatile memory, one of the following, the ROM 205, the ROM 208, and the FeRAM 209.

The print server 300 has the communication units 301 and 302, a CPU 305, a data distribution unit 306, a storage unit 307, a display unit 308, an input unit 309, a memory 310, and the antennas 311 and 312. The CPU 305 (a second controller) executes programs stored in the storage unit 307. As a result, processing in the print server 300 is implemented in each embodiment. The data distribution unit 306 is connected to the communication units 301 and 302. The data distribution unit 306 distributes control signals for communication, image data, and so forth to the communication units 301 and 302 under the control of the CPU 305. Namely, the same information is input to both of the communication units 301 and 302. The display unit 308 is connected to the display device 304 in FIG. 1. The input unit 309 is connected to the input device 303 in FIG. 1. The memory 310 stores programs, values of variables, and so forth. The communication units 301 and 302 carry out communication using the same method used by the communication units 211 and 221 of the image forming apparatus 100, as mentioned above. As shown in the example in FIG. 2, it is assumed that the base station B is installed outside the image forming apparatus 100. For example, the base station B can be installed in a private or local environment such as a factory in a company. The base station B may be operated by a mobile network operator. It should be noted that the base station B may be provided in the image forming apparatus 100, the print server 300, or the like.

Figure 3:
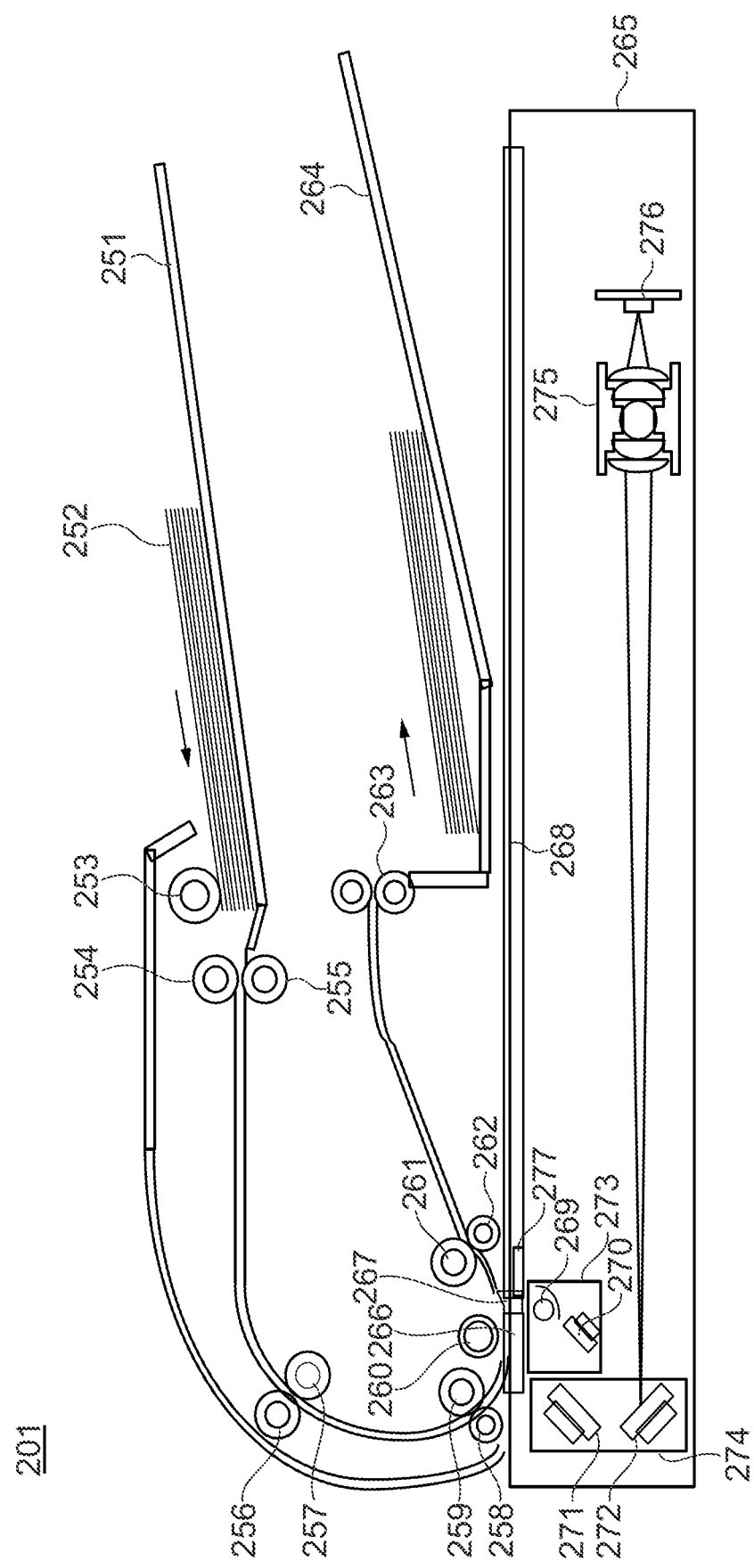
FIG. 3 is a view showing an example of an arrangement of a reading apparatus.

A description will now be given of the reading apparatus 201. FIG. 3 is a view showing an example of an arrangement of the reading apparatus 201. Originals 252, which are sheets, are mounted on an original tray 251. A sheet feeding roller 253 is provided above the original tray 251. The sheet feeding roller 253 is connected to the same driving source, to which a separating/conveying roller 254 is connected, and rotates in response to rotation of the separating/conveying roller 254 and feeds the originals 252. The sheet feeding roller 253 is normally retracted at an upper position that is a home position, at which the sheet feeding roller 253 never interferes with actions for placing the original 252. When a sheet feeding operation is started, the sheet feeding roller 253 moves down to abut against an upper side of the originals 252. The sheet feeding roller 253 is pivotally supported by a predetermined arm and is caused to move up and down by swinging of the arm.

A separating/conveying following roller 255 is disposed in opposed relation to the separating/conveying roller 254 and pressed against the separating conveyance roller 254. The separating/conveying following roller 255 is made of a rubber material or the like which has slightly lower friction than the separating conveyance roller 254, and conveys the originals 252, which have been fed by the sheet feeding roller 253, one by one in cooperation with the separating conveyance roller 254. A registration roller 256 and a registration following roller 257 corrects a position of a leading end of the conveyed original 252. Specifically, when the leading end of the separate original 252 abuts against a nip of the registration roller 256 and the registration following roller 257 which are standing still, a loop is generated on the original 252, which corrects the position of its leading end. A lead roller 258 and a lead following roller 259 then convey the original 252 toward a flow scan glass 266. A platen roller 260 is disposed in opposed relation to the flow scan glass 266.

A CCD line sensor 276 reads an image on a surface of the original 252 passing over the flow scan glass 266. When the reading of the image on the surface of the original 252 by the CCD line sensor 276 is completed, a lead discharge roller 261 and a lead discharge following roller 262 convey the original 252 to sheet discharge rollers 263. A jump board 267 scoops up the original 252 from the flow scan glass 266. The sheet discharge rollers 263 discharge the original 252 onto a sheet discharge tray 264. An image reading unit 265 has a lamp 269 that irradiates a reading surface of the original 252 with light, and mirrors 270, 271, and 272 that guide reflected light from the original 252 to a lens 275 and the CCD line sensor 276. The lamp 269 and the mirror 270 are mounted on a first mirror holder 273. The mirrors 271 and 272 are mounted on a second mirror holder 274.

The first mirror holder 273 and the second mirror holder 274 are joined to driving motors by wires and moved parallel to an original platen glass 268 by rotation drive of the driving motors. The reflected light from the original 252 is guided to the lens 275 via the mirrors 270, 271, and 272 to form an image on a light receiving area of the CCD line sensor 276. The CCD line sensor 276 causes a light receiving element to photoelectrically convert the image formed by the reflected light and outputs an electric signal according to the amount of incident light. Reading using the reading apparatus 201 having the arrangement described above can be performed using two modes i.e. a fixed scan mode and a flow scan mode. In the fixed scan mode, the original 252 is placed on the original platen glass 268, and the reading apparatus 201 reads the original 252 while moving the first mirror holder 273 and the second mirror holder 274. In the fixed scan mode, an image on a screen of a cell phone or the like can be read. In the flow scan mode, the reading apparatus 201 reads the original 252 at the location of the flow scan glass 266 while conveying the original 252, with the first mirror holder 273 and the second mirror holder 274 standing still. The arrangement of the reading apparatus 201 is not limited to the example shown in FIG. 3.

Figure 4:
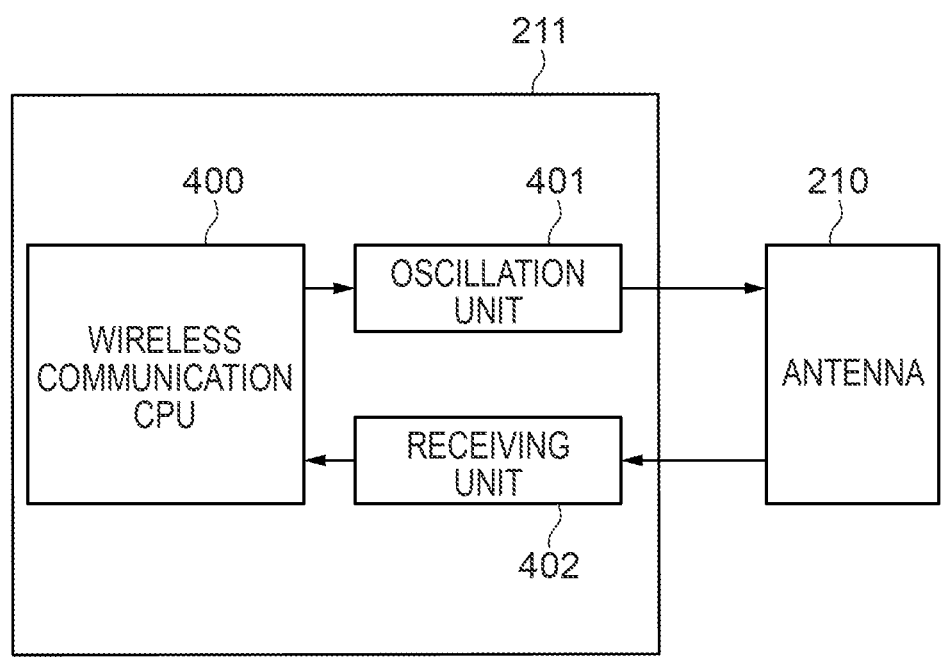
FIG. 4 is a block diagram showing an arrangement of a communication unit.

A description will now be given of the communication unit 211 in the image forming apparatus 100. FIG. 4 is a block diagram showing an arrangement of the communication unit 211. The communication unit 221 of the image forming apparatus 100 and the communication units 301 and 302 of the print server 300 have the same arrangement as that of the communication unit 211. As described above, the communication unit 211 carries out communication compliant with the standard for the 5th generation mobile communication system. The communication unit 211 has a wireless communication CPU 400, an oscillation unit 401, and a receiving unit 402. The antenna 210 is connected to the communication unit 211.

The wireless communication CPU 400 controls the communication unit 211. The wireless communication CPU 400 inputs data received from the CPU 200 (data to be sent) to the oscillation unit 401. The oscillation unit 401 converts a data string, which has been input, to a modulated signal, and amplifies the modulated signal while oscillating the same at a predetermined frequency. The oscillation unit 401 then inputs the amplified modulated signal to the antenna 210, which in turn radiates a radio signal. Here, the radio signal radiated at the predetermined frequency is a millimeter wave. The communication unit 211 sends data such as image data and a control signal. The receiving unit 402 performs filtering on the radio signal received by the antenna 210 and amplifies it. After that, the receiving unit 402 performs, for example, demodulation of the modulated signal to generate a data string. The generated data string is input to the wireless communication CPU 400. A radio wave received by the antenna 210 is a millimeter wave as well.

The base station B receives radio signals radiated by the antennas 210, 220, 311, and 312. According to contents of the received radio signals, the base station B radiates the radio signals to the image forming apparatus 100 and the print server 300. The antennas 210, 220, 311, and 312 receive the radio signals radiated by the base station B.

Figure 5:
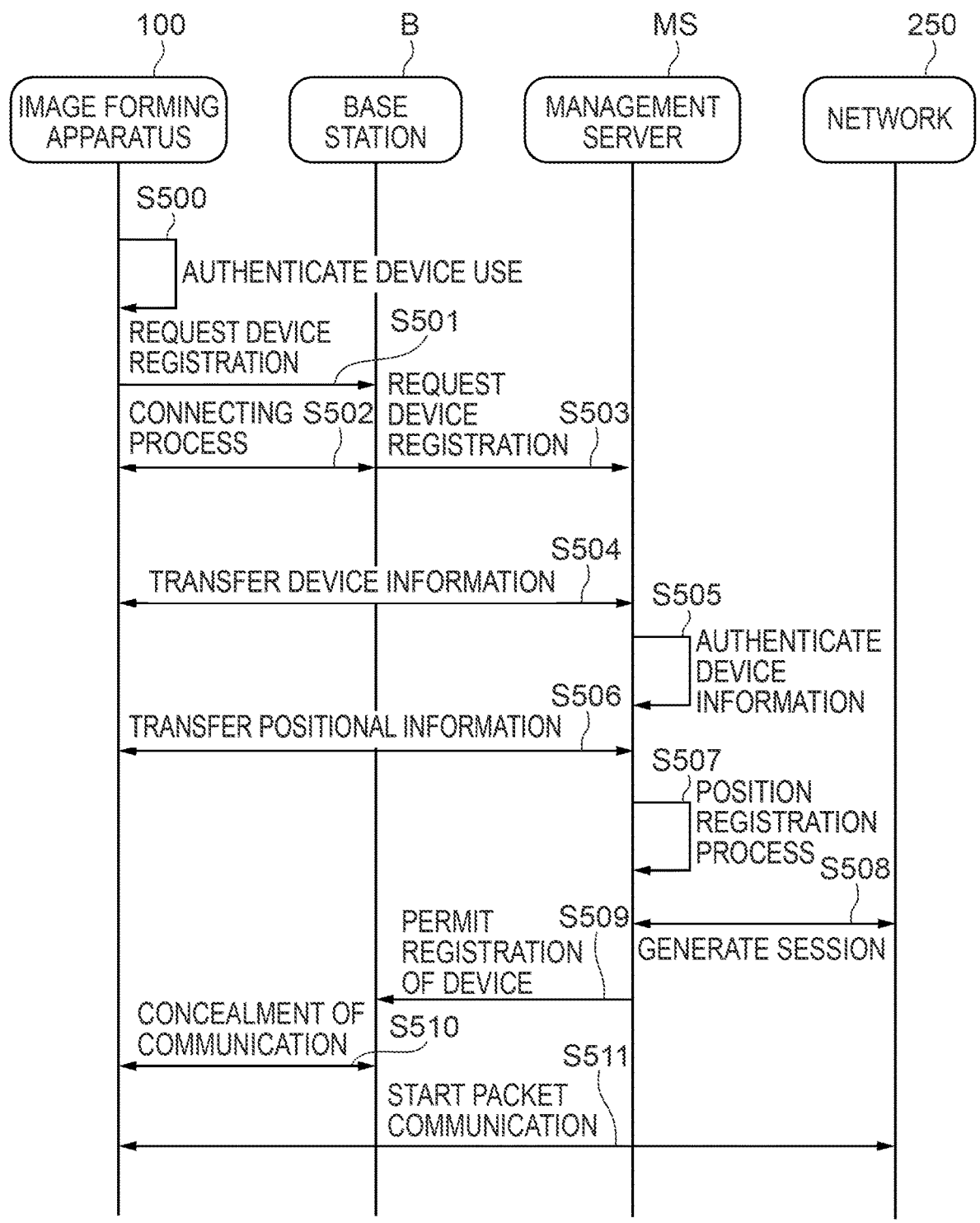
FIG. 5 is a sequence diagram showing an example of a flow in which network communication is established.

A description will now be given of how the mobile communication system establishes communication. FIG. 5 is a sequence diagram showing an example of a flow in which network communication is established. Each process in the sequence diagram of FIG. 5 is started when the power to the image forming apparatus 100 is turned on. The CPU 200 of the image forming apparatus 100 performs control to display a screen, which prompts input of authentication information (for example, PIN (Personal Identification Number)) for using the image forming apparatus 100, on the operating unit 202. The authentication information is information for use in an authentication process at a terminal level for reading a profile such as ISMI stored on the SIM card connected to the SIM connector 213 or the eSIM module 212. In S500, the CPU 200 performs authentication (device use authentication) for using the device based on the input authentication information and judges whether or not to permit reading of the profile. The device use authentication in S500 may be skipped.

The CPU 200 of the image forming apparatus 100 sends a device registration request that requests registration of the device, to the base station B (S501). Upon receiving the device registration request, the base station B carries out a process to connect with the image forming apparatus 100 as the device (S502). The base station B that has received the device registration request sends the received device registration request to the management server MS (S503). The management server MS transfers device information to and from the image forming apparatus 100 via the base station B (S504). The device information to be transferred includes the profile read from the SIM card or eSIM module 212 described above. Based on the profile received from the image forming apparatus 100, the management server MS performs authentication of the device information (S505).

The image forming apparatus 100 notifies the management server MS of positional information about the base station, which covers a position registration management area where the image forming apparatus 100 is located, via the base station B (S506). The management server MS carries out a position registration process to register the notified positional information (S507). After the position registration process has been carried out, the management server MS generates a session for the image forming apparatus 100 to connect with the network 250 (S508). When the generated session has been established, the management server MS sends a device registration permission notification that permits registration of the image forming apparatus 100, to the base station B (S509). Communication between the image forming apparatus 100 and the base station B is kept confidential (S510). Then, a packet communication path between the image forming apparatus 100 and the network 250 is established, and packet communication is started (S511).

Figure 6:
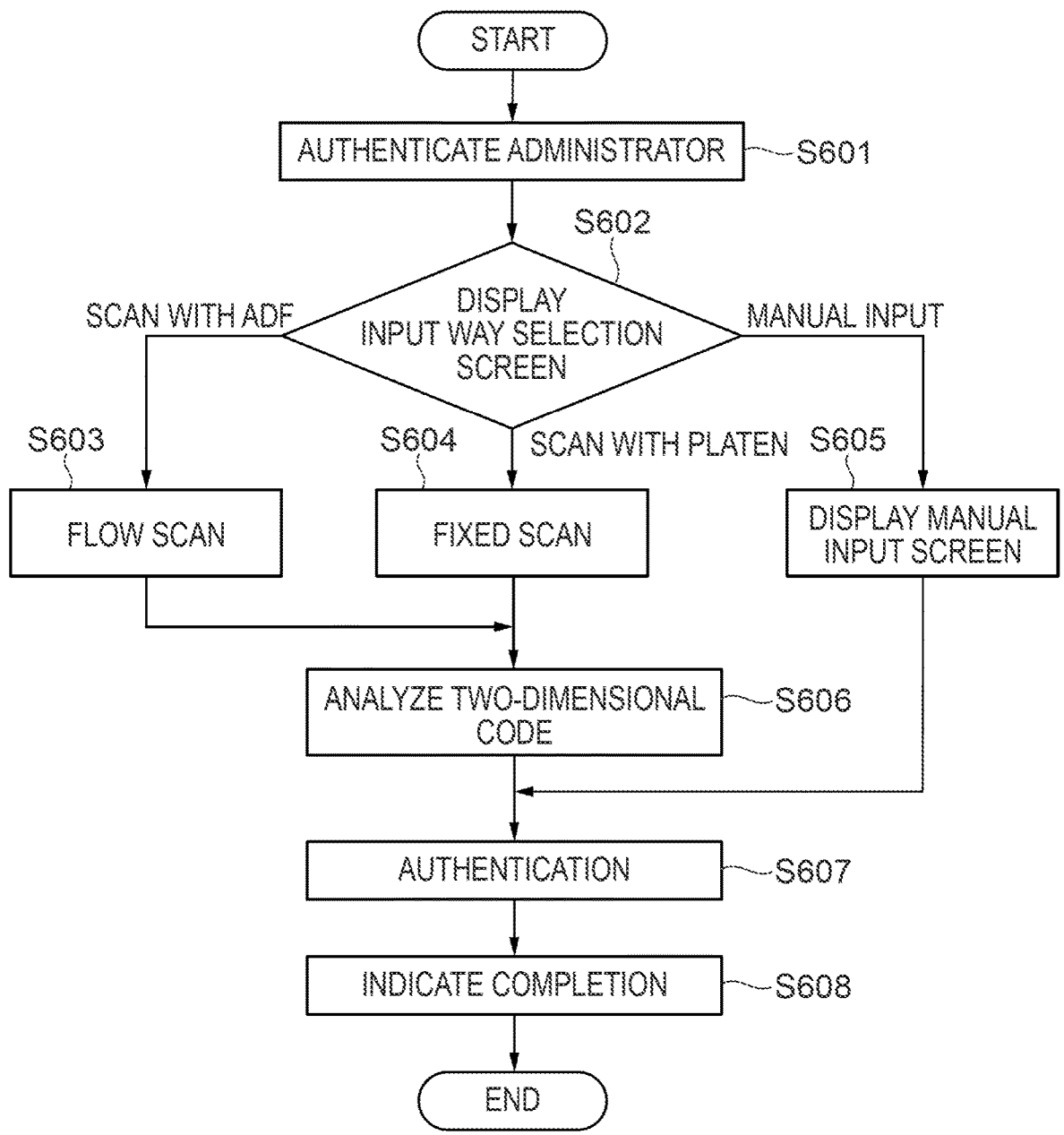
FIG. 6 is a flowchart showing an example of an authentication flow.

A description will now be given of an authentication flow in the mobile communication system. FIG. 6 is a flowchart showing an example of the authentication flow. When the image forming apparatus 100 is to carry out communication using the mobile communication system described above, authentication for verifying an operator, who is operating the image forming apparatus 100, as an administrator is performed. This is because there is the possibility that the image forming apparatus 100 is placed at a location where it is operated by an unspecified number of operators. For example, if a malicious operator operates the image forming apparatus 100, unauthorized authentication may occur. This may cause unauthorized communication using the image forming apparatus 100 or disable the image forming apparatus 100 to carry out communication. Moreover, in terms of security, problems such as leakage of internal information from the image forming apparatus 100 may arise. Therefore, the CPU 200 of the image forming apparatus 100 carries out an authentication process for the administrator (S601).

Figure 7A:
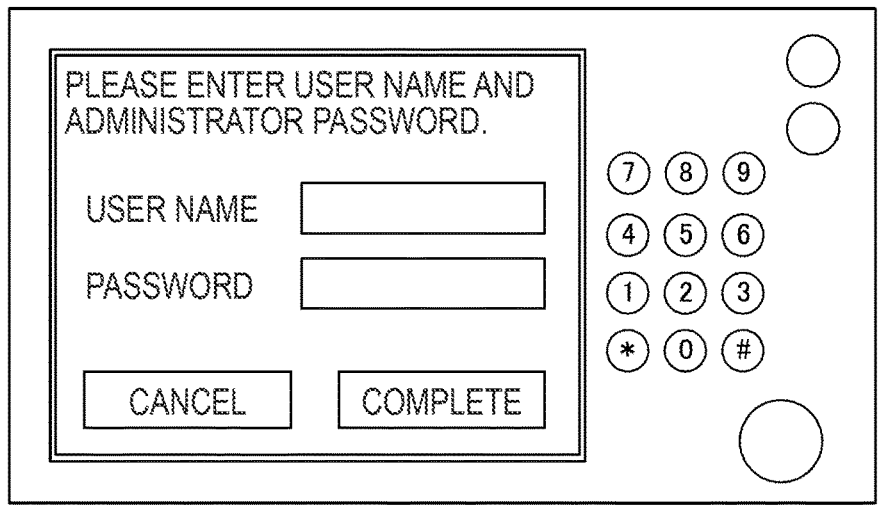
FIGS. 7A to 7F are views showing examples of screens displayed on an operating unit.

A description will now be given of screens displayed on the operating unit 202 when the authentication process for the administrator is carried out. FIGS. 7A to 7F are views showing examples of the screens displayed on the operating unit 202 in the first embodiment. FIG. 7A is a view showing an example of the screen displayed when the authentication process for the administrator is carried out. Upon recognizing that authentication setting by the operator has been started, the CPU 200 performs control to display the screen in FIG. 7A on the operating unit 202. In the description of each embodiment, it is assumed that the operating unit 202 is a touch screen display, the operating unit 202 having an input function and a display function. The screen in FIG. 7A includes input fields for inputting a user name and an administrator password. By operating a numeric keypad and soft keys displayed on the operating unit 202, the operator can input a user name and a password (administrator password). When a "Complete" button is operated, the operating unit 202 accepts the input information.

The CPU 200 carries out the authentication process for the administrator by verifying if the input information is valid. The valid information is registered in the image forming apparatus 100 in advance. When the input information is valid, the CPU 200 judges that authentication is successful. On the other hand, when the input information is not valid, the CPU 200 judges that authentication is unsuccessful. The CPU 200 continues to carry out the process in the step S601 in FIG. 6 as long as authentication is unsuccessful. On the other hand, when authentication is successful, the CPU 200 lets the flow proceed to S602. Although the example in which authentication is performed based on a user name and a password which have been input has been described, authentication in S601 may be performed using, for example, an ID card. It should be noted that when authentication is unsuccessful in S601, the CPU 200 may stop the image forming apparatus 100 or end the process in the flowchart of FIG. 6.

Figure 7B:
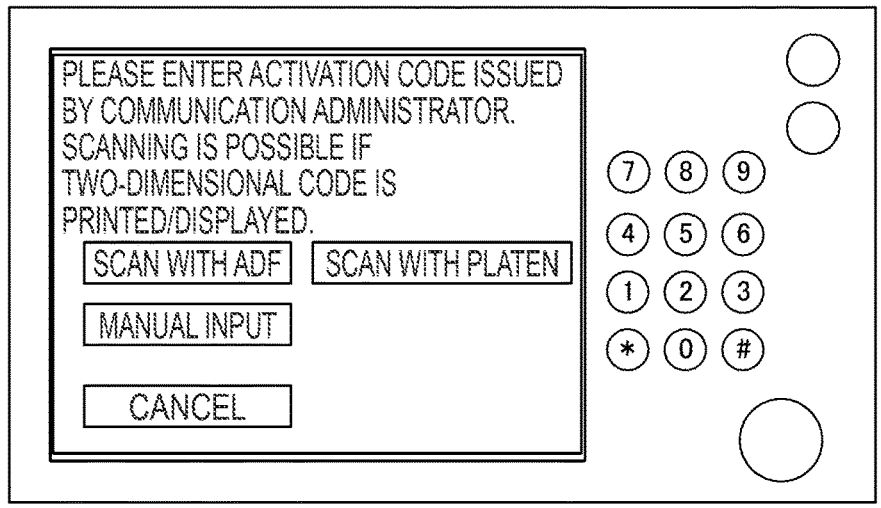

Then, the CPU 200 displays a screen that prompts selection of a method for inputting an activation code for authentication of communication (S602). FIG. 7B is a view showing an example of the screen that prompts selection of the method for inputting the activation code. The activation code is an authentication code for enabling communication using a mobile communication system and is provided by a mobile network operator, a radio operator, or the like. For example, when a license for use of a line communication network in a mobile communication system operated by a mobile network operator is enabled, the mobile network operator provides the activation code the administrator of the image forming apparatus 100. The activation code is provided together with a URL (Uniform Resource Locator) of the management server MS that performs authentication. In the description of each embodiment, it is assumed that the activation code is a two-dimensional code, but is not limited to the two-dimensional code and may be a barcode, a character string, or the like. The activation code and information indicating the URL of the management server MS can be provided from the mobile network operator, radio operator, or the like by, for example, e-mail or mail.

In the example of the screen in FIG. 7B, any of "Scan with ADF", "Scan with Platen", and "Manual Input" buttons can be selected. The "Scan with ADF" button is a button that is selected when a two-dimensional code is read using the flow scan mode. The two-dimensional code includes information indicating the URL of the management server MS and the activation code. For example, the "Scan with ADF" button is selected when the two-dimensional code can be read using an ADF (Auto Document Feeder) in, for example, a case where the two-dimensional code is printed on a sheet.

The "Scan with Platen" button is a button that is selected mainly when an image including a two-dimensional code displayed on, for example, a screen of a cell phone such as a smartphone or a screen of electronic paper is read using the fixed scan mode. The "Scan with Platen" button can also be selected in a case where a size of a sheet on which a two-dimensional code is printed does not support the ADF, a case where a two-dimensional code is printed on a booklet, and so forth. Namely, the "Scan with Platen" button is a button that is selected when a two-dimensional code is read directly from a screen, a booklet, or the like. The URL of the management server MS and the activation code may be provided as character information from the mobile network operator. The "Manual Input" button is a button for the operator to manually input the URL of the management server MS and the activation code using the operating unit 202.

Figure 7C:
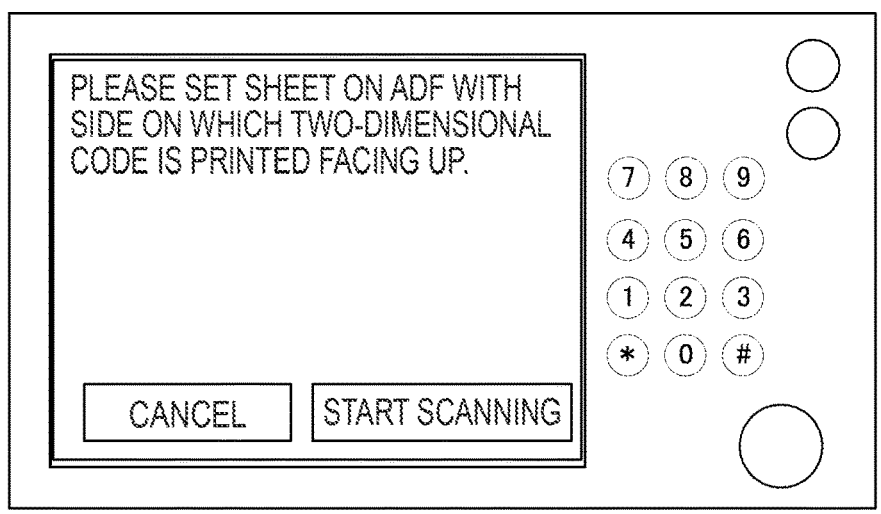

Referring to FIG. 6, when an operation to select "Scan with ADF" is performed in S602, the CPU 200 lets the flow proceed to S603. FIG. 7C is a view showing an example of the screen displayed when the "Scan with ADF" button has been selected. The CPU 200 performs control to display a message, which prompts the operator to put a sheet with a side on which a two-dimensional code is printed facing up, on the operating unit 202. When a "Start Scanning" button is operated, the CPU 200 causes the reading apparatus 201 to execute the flow scan mode (S603). As a result, the reading apparatus 201 performs flow scanning of an image printed on a sheet.

Figure 7D:
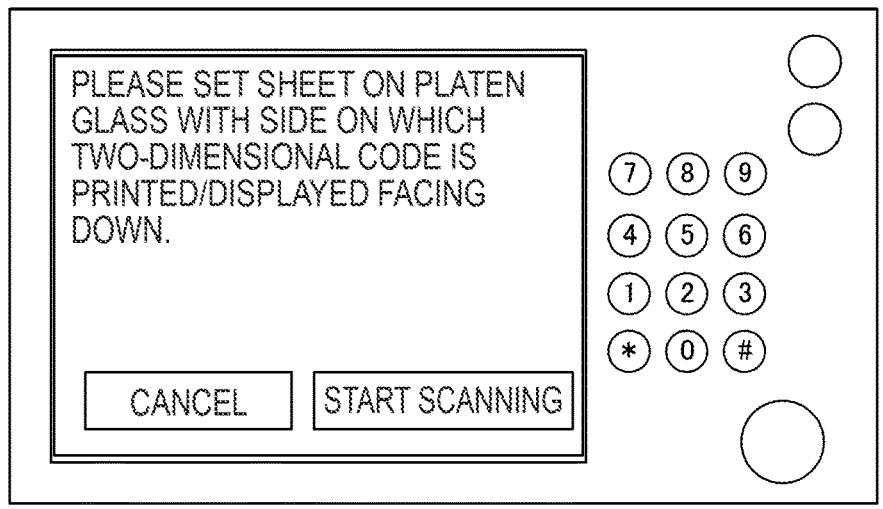

As shown in FIG. 6, when an operation to select the "Scan with Platen" button is performed in S602, the CPU 200 lets the flow proceed to S604. FIG. 7D is a view showing an example of the screen displayed when the "Scan with Platen" button has been selected. The CPU 200 performs control to display a message, which prompts the operator to put a surface on which two-dimensional codes are printed, such as a sheet or booklet on which the two-dimensional codes are printed on the original platen glass 268, on the operating unit 202. When a "Start Scanning" button is operated, the CPU 200 causes the reading apparatus 201 to execute the fixed scan mode (S604). As a result, the reading apparatus 201 performs fixed scanning of an image displayed on a screen of a cell phone or an image printed on a sheet.

Figure 7E:
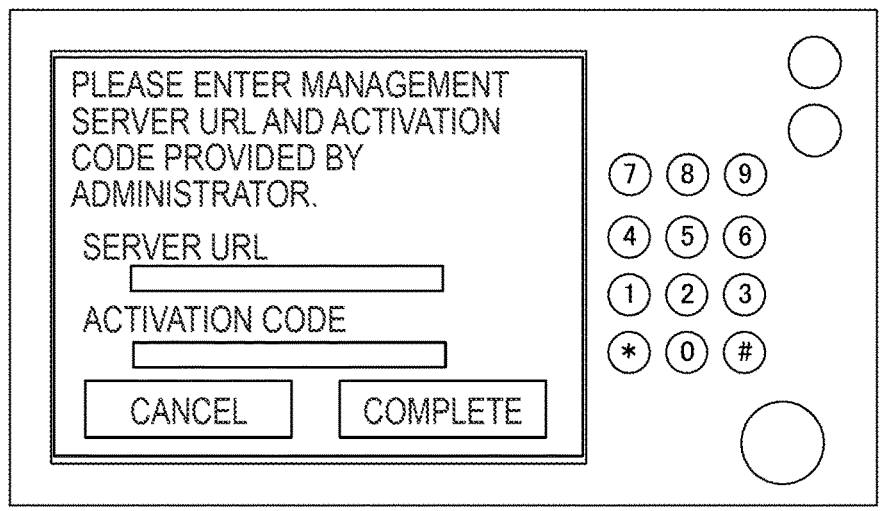

When an operation to select the "Manual Input" button is performed in S602, the CPU 200 lets the flow proceed to S605. The CPU 200 performs control to display a screen, which prompts the operator to input "Server URL" and "Activation Code", on the operating unit 202 (S605). FIG. 7E is a view showing an example of the screen displayed when the "Manual Input" button has been selected. The screen in FIG. 7E includes input fields for inputting "Server URL" and "Activation Code". When the operator has manually inputted the URL of the management server MS and the activation code using the numeric keypad, soft keys, or the like and performs an operation to select a "Complete" button, the CPU 200 accepts the input.

After the processes in S603 and S604 have been carried out, the CPU 200 lets the flow proceed to S606. The CPU 200 analyzes the two-dimensional code included in the image read in S603 or S604 (the image printed on the sheet or the image on the screen displayed on the cell phone) (S606). By analyzing the two-dimensional code, the CPU 200 performs image recognition of the URL of the management server MS and the activation code represented by the two-dimensional code. In the case where the process in S605 has been carried out, the URL of the management server MS and the activation code have been manually input, and hence the process in S606 is not carried out.

Figure 7F:
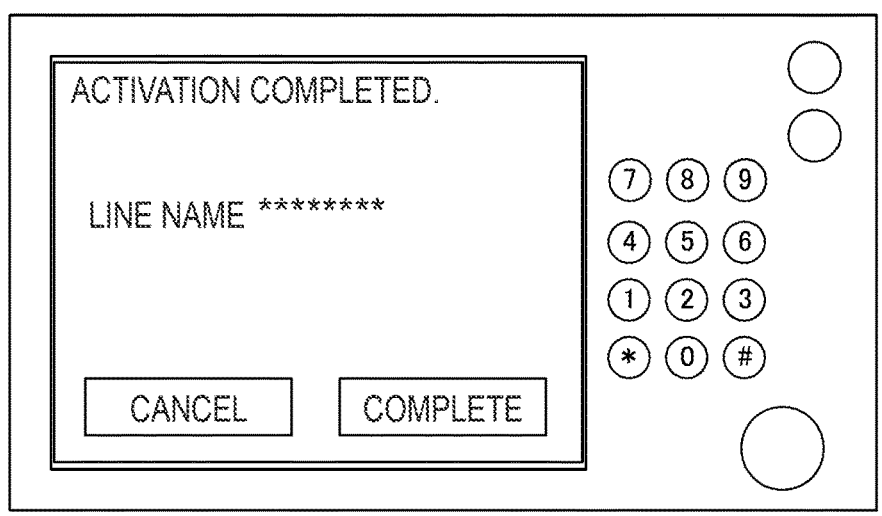

The CPU 200 performs control to access the management server MS using the said URL of the management server MS and also carries out an authentication-related process using the said activation code (S607). Detailed description of the authentication-related process will be given later. The CPU 200 performs control to display a notification, which indicates that the authentication process using the activation code has been completed, on the operating unit 202 (S608). FIG. 7F is a view showing an example of a screen indicating that the authentication process is successful. Referring to FIG. 7F, a name of a communication line in the mobile communication system is displayed.

A description will now be given of the said authentication-related process. Authentication by the management server MS is required for the image forming apparatus 100 to connect to the mobile communication system using eSIM so as to be able to use wireless communication. When the authentication is successful, the management server MS writes a profile into the eSIM module 212. This enables the image forming apparatus 100 to use wireless communication in the mobile communication system using eSIM.

Here, the profile is written into the eSIM module 212 of the image forming apparatus 100 is performed by the management server MS. The management server MS remotely writes the profile into the eSIM module 212 of the image forming apparatus 100 using an activation code that uniquely designates the profile. The activation code is comprised of a unique combination of numerals and Roman characters that can uniquely specify the profile. As described above, the activation code and the URL of the management server MS are provided from the management server MS.

When the operator has performed an operation to input the activation code and the URL of the management server MS to the operating unit 202 of the image forming apparatus 100, the CPU 200 accepts this operation. Upon accepting the operation, the CPU 200 sends a request to obtain the profile to the management server MS. In accordance with the received request, the management server MS carries out a predetermined process to write the profile into the eSIM module 212 of the image forming apparatus 100. This enables the image forming apparatus 100 to connect with the mobile communication system and perform communication.

FIG. 8 is a sequence diagram showing an example of a flow of authentication in the mobile communication system using eSIM. In S801, the CPU 200 of the image forming apparatus 100 performs control to connect with the wireless LAN router 249 via LAN communication. When wireless LAN connection between the image forming apparatus 100 and the wireless LAN router 249 is established, the wireless LAN router 249 establishes a network connection with the network 250 (S802). This enables the image forming apparatus 100 and the management server MS to communicate with each other.

The CPU 200 of the image forming apparatus 100 performs control to send an activation code to the management server MS (S803). Upon receiving the activation code, the management server MS performs authentication by verifying if the received activation code is valid (S804). When the authentication is successful, the management server MS permits downloading of a profile corresponding to the activation code and sends the profile to the image forming apparatus 100. The CPU 200 of the image forming apparatus 100 stores the profile obtained by downloading in the eSIM module 212 (S805). When the downloading of the profile has been completed, the CPU 200 of the image forming apparatus 100 sends a notification that the downloading has been completed to the management server MS (S806). When the authentication is unsuccessful in S804, the management server MS carries out an error process without permitting downloading of the profile.

The CPU 200 of the image forming apparatus 100 performs control to reactivate the eSIM module 212 (S807). When the eSIM module 212 has been reactivated, activation of eSIM is performed (S808). The CPU 200 then accesses the base station B and performs control to establish a network connection (S809). When the network connection with the base station B has been established, the base station B establishes a network connection with the network 250 (S810). This enables the image forming apparatus 100 to carry out communication (5G communication) using the mobile communication system with the network 250 via the base station B.

Figure 9:
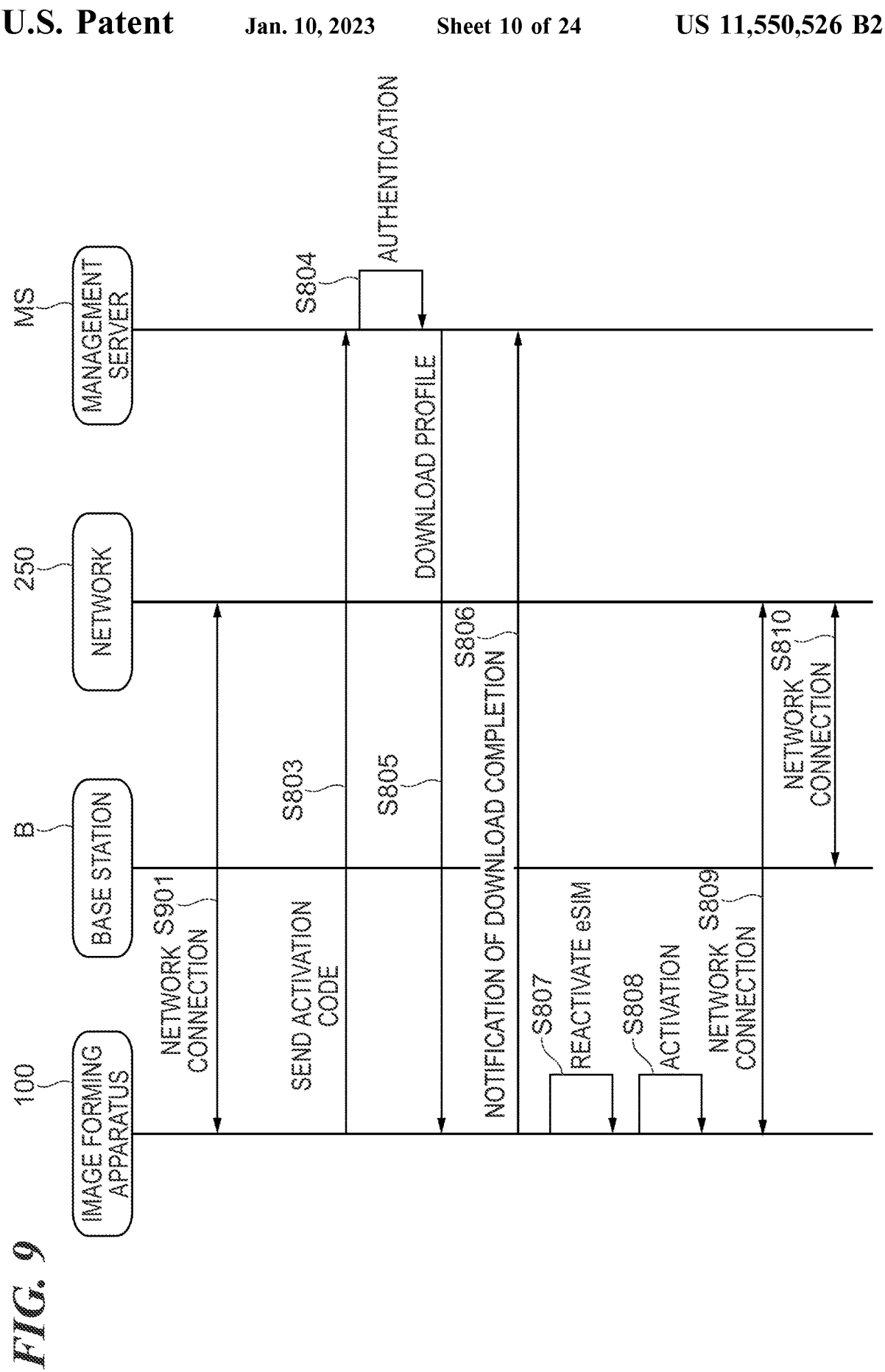
FIG. 9 is a sequence diagram showing another example of a flow of authentication performed in the mobile communication system using

Although in the example in FIG. 8 described above, the network connection is established between the image forming apparatus 100 and the network 250 via the wireless LAN router 249, a direct network connection may be established between the image forming apparatus 100 and the network 250. FIG. 9 is a sequence diagram showing another example of the flow of authentication in the mobile communication system using eSIM. Referring to FIG. 9, the image forming apparatus 100 performs a network connection with the network 250 via the base station B (S901). This network connection, which is here a network connection for sending an activation code, may be a network connection using a network other than the mobile communication system instead. As a result, the image forming apparatus 100 and the management server MS become communicatable with each other. Processes in S803 to S810 are the same as those in FIG. 8, and hence description thereof is omitted.

As described above, the reading apparatus 201 reads the URL of the management server MS and the activation code, which are used in performing authentication so that the image forming apparatus 100 can use the mobile communication system using eSIM. The URL of the management server MS and the activation code may be a complicated combination of characters and numerals, and hence problems of making an input operation troublesome and causing input errors or the like may arise. On the other hand, in the present embodiment, the image forming apparatus 100 causes the reading apparatus 201 to read the URL of the management server MS and the activation code from a sheet or display screen on which they are printed as a two-dimensional code. This simplifies the authentication procedure for using the mobile communication system using eSIM. As a result, the image forming apparatus 100 can suitably carry out communication using the mobile communication system. For example, there may be a case where a code (for example, a two-dimensional code) corresponding to the URL of the management server MS and the activation code is provided in an e-mail from a network operator of the mobile communication system. In this case, authentication is completed merely by the reading apparatus 201 reading the code e-mailed to an operator's terminal, and therefore, authentication is simplified. The process described above enables the image forming apparatus 100 to carry out communication using the mobile communication system with the network 250 via the base station B. This enables the image forming apparatus 100 to carry out communication (communication using the mobile communication system) with the print server 300 in FIG. 2 via the network 250. A description will now be given of communication between the image forming apparatus 100 and the print server 300. In each embodiment, control signals and image data are communicated between the image forming apparatus 100 and the print server 300.

Figure 10A:
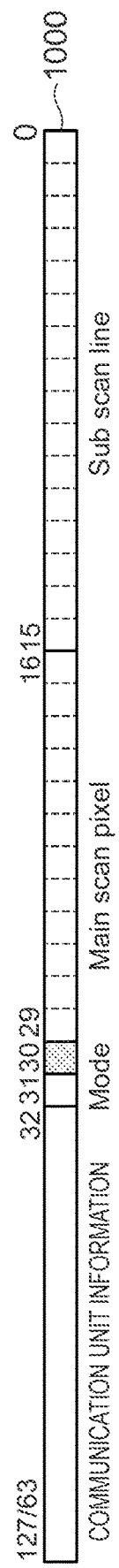
FIGS. 10A and 10B are views showing examples of formats of control signals.
Figure 10B:
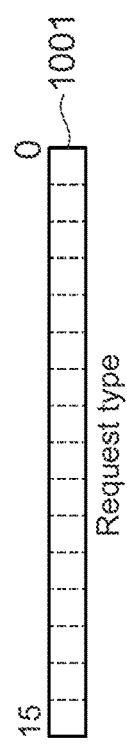

FIGS. 10A and 10B are views showing examples of formats of the control signals. As shown in FIGS. 10A and 10B, a control signal includes two command packets including the PAGE_SET 1000 and the PAGE_REQ 1001. The PAGE_SET 1000 is a packet for use in providing notification about an image data size and a transfer mode. For example, with the PAGE_SET 1000, whether the transfer mode is a color image transfer mode or a monochrome image transfer mode is identified. The PAGE_SET 1000 includes information about Main Scan Pixel and Sub Scan Pixel for use in setting the number of pixels. The PAGE_SET 1000 also includes communication unit information. Detailed description of the communication unit information will be given later. The PAGE_REQ 1001 is a packet for use in outputting a request to start transmission of image data.

Figure 11:
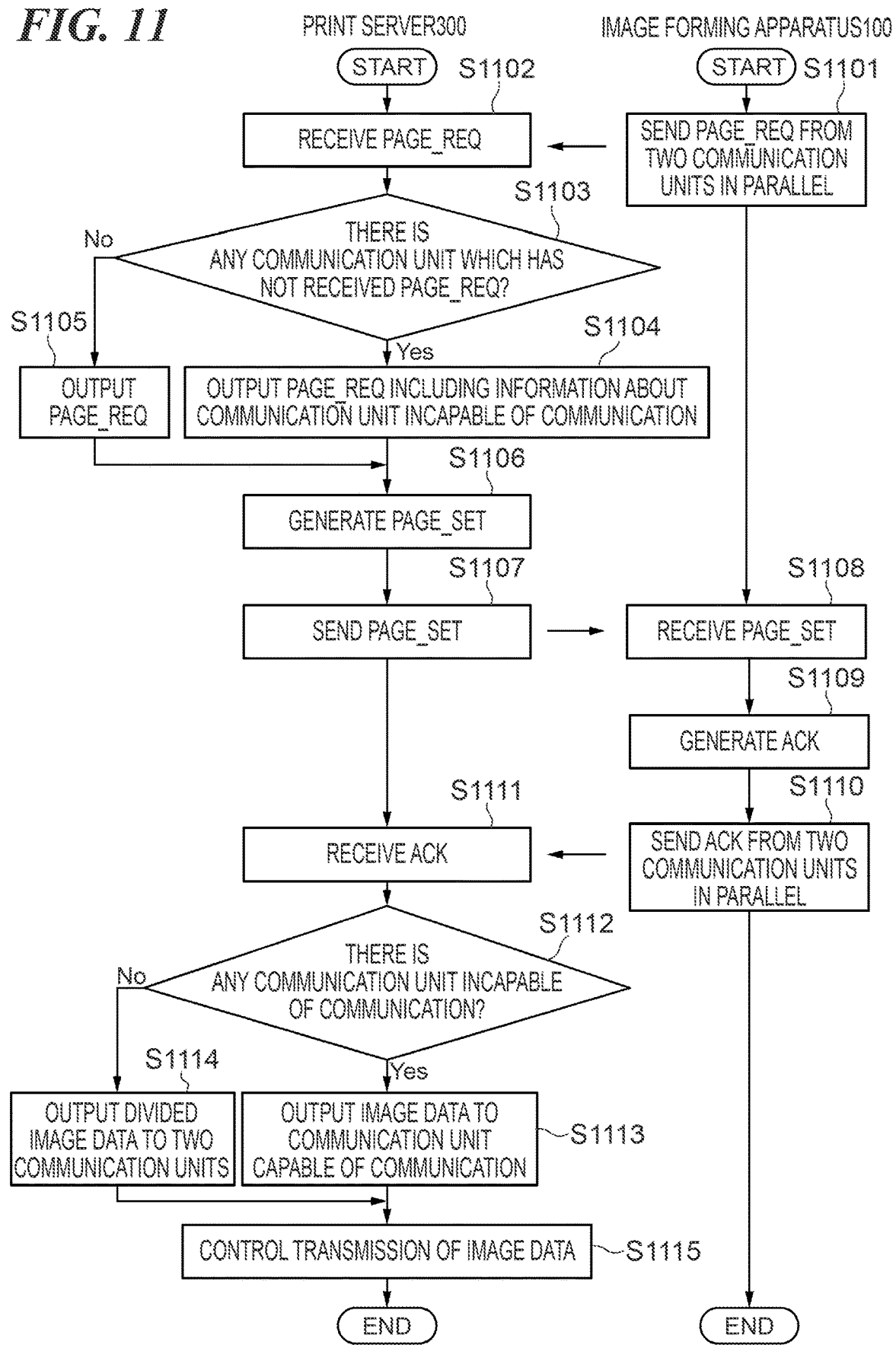
FIG. 11 is a sequence diagram showing an example of a flow of a process in which the print server transmits image data to the image forming apparatus.

FIG. 11 is a sequence diagram showing an example of a flow of a process in which the print server 300 transmits image data to the image forming apparatus 100. First, the CPU 200 of the image forming apparatus 100 outputs a control signal, the PAGE_REQ 1001, to the data distribution unit 241. The data distribution unit 241 outputs the input PAGE_REQ 1001 to both of the communication units 211 and 221. The communication units 211 and 221 radiate, in a parallel way (send in parallel), radio signals which represent the PAGE_REQ 1001 to the base station B via the antennas 210 and 220 (S1101). Since the data distribution unit 241 outputs the PAGE_REQ 1001 to both of the communication units 211 and 221 as described above, the PAGE_REQ 1001 is mirrored between the communication units 211 and 221. The communication units 211 and 221 send the radio signals representing the mirrored PAGE_REQ 1001 to the base station B, in a parallel way.

The base station B receives the radio signals (the radio signals representing the PAGE_REQ 1001) radiated from the image forming apparatus 100. Then, the base station B subjects the received radio signals to a predetermined process and then radiates the radio signals. The communication units 301 and 302 of the print server 300 receive the radio signals (the radio signals representing the PAGE_REQ 1001) radiated from the base station B via the antennas 311 and 312 (S1102). At this time, if one of the communication units 301 and 302 is not able to communicate, the other (that is, a communicatable communication unit) out of the communication units 301 and 302 receives the radio signals radiated from the base station B.

The PAGE_REQ 1001, which is the control signal, is input from one or both of the communication units 301 and 302 to the data distribution unit 306. The data distribution unit 306 judges whether or not there is any out of the communication units 301 and 302 which has not received PAGE_REQ 1001 (S1103). When PAGE_REQ 1001 has been input from one of the communication units 301 and 302 to the data distribution unit 306, the data distribution unit 306 judges that the other one of the communication units 301 and 302 which has not input the PAGE_REQ 1001 to the data distribution unit 306 is not able to communicate, and hence the result of the judgment in S1103 is positive ("YES"). On the other hand, when the PAGE_REQ 1001 has been input from both of the communication units 301 and 302 to the data distribution unit 306, the result of the judgment in S1103 by the data distribution unit 306 is negative ("NO").

When the result of the judgment in S1103 is "YES", the data distribution unit 306 lets the flow proceed to S1104. The data distribution unit 306 includes information indicating a communication unit incapable of communication in the PAGE_REQ 1001 and outputs the PAGE_REQ 1001 to the CPU 305 (S1104). The information indicating the communication unit incapable of communication is information for generating communication unit information in the PAGE_SET 1000 in FIG. 10A. When the result of the judgment in S1103 is "NO", the data distribution unit 306 lets the flow proceed to S1105. The data distribution unit 306 outputs PAGE_REQ 1001 as it is to the CPU 305 (S1105).

The CPU 305 generates the PAGE_SET 1000 from the PAGE_REQ 1001 that has been input (S1106). At this time, when the information indicating the communication unit incapable of communication is input from the data distribution unit 306, the CPU 305 generates communication unit information and includes it in the PAGE_SET 1000. The CPU 305 outputs the generated PAGE_SET 1000 to the data distribution unit 306, and the data distribution unit 306 outputs the input PAGE_SET 1000 to one or both of the communication units 301 and 302. When the communication unit information of the PAGE_SET 1000 indicates that both of the communication units 301 and 302 are capable of communication, the data distribution unit 306 outputs, in a parallel way, the PAGE_SET 1000 to the communication units 301 and 302. On the other hand, when the communication unit information of the PAGE_SET 1000 indicates that one of the communication units 301 and 302 is incapable of communication, the data distribution unit 306 outputs the PAGE_SET 1000 to one of the communication units 301 and 302 which is capable of communication.

One or both of the antennas 311 and 312 radiate the radio signal representing the PAGE_SET 1000 to the base station B (S1107). When both of the communication units 301 and 302 are capable of communication, the antennas 311 and 312 radiate the radio signals representing the PAGE_SET 1000 to the base station B in a parallel way. Namely, the mirrored radio signals are radiated from the antennas 311 and 312. On the other hand, when one of the communication units 301 and 302 is incapable of communication, the antenna for the communication unit incapable of communication radiates the radio signal representing the PAGE_SET 1000 to the base station B.

The base station B radiates a radio signal representing the received PAGE_SET 1000. The communication units 211 and 221 of the image forming apparatus 100 receive the radio signal including the PAGE_SET 1000 radiated from the base station B via the antennas 210 and 220 (S1108). At this time, one of the antennas 210 and 220 may receive the radio signal. The data distribution unit 241 outputs information about the PAGE_SET 1000 input from one or both of the communication units 211 and 221 to the CPU 200. The CPU 200 generates ACK (Acknowledgement) about the PAGE_SET 1000 and outputs the generated ACK to the data distribution unit 241 (S1109). The data distribution unit 241 outputs the input ACK to the communication units 211 and 221. The communication units 211 and 221 radiates, in parallel, a radio signal representing ACK toward the base station B via the antennas 210 and 220 (S1110).

The base station B receives the radio signal representing the ACK, subjects the received radio signal to a predetermined process, and radiates it. The communication units 301 and 302 of the print server 300 receive the radio signal representing the ACK radiated by the base station B, via the antennas 311 and 312 (S1111). At this time, when one of the antennas 311 and 312 is incapable of communication, the antenna capable of communication receives the radio signal representing the ACK. The data distribution unit 306 outputs the ACK input from one or both of the communication units 301 and 302, to the CPU 305.

The CPU 305 judges whether or not there is any communication unit incapable of communication (S1112). The CPU 305 can make the judgment in S1112 in the same manner as in S1103. When the result of the judgment in S1112 is "YES", the CPU 305 outputs image data, which should be sent, to one of the communication units 301 and 302 which is capable of communication (S1113). When the result of the judgment in S1112 is "NO", the CPU 305 divides the image data, which should be sent, to generate two separated image data, outputs one of the two separated image data to the communication unit 301 and the rest (the other one) to the communication unit 302 (S1114).

When outputting the image data in S1113 or S1114, the CPU 305 adds information about a destination of the image data (in the present embodiment, the image forming apparatus 100) to the image data. It should be noted that a signal may be separately used as the information about the destination. The CPU 305 performs control to send the image data (S1115) in accordance with the information about the destination. In a case where the process in S1113 has been carried out, the CPU 305, the CPU 305 performs control to send the image data to one of the communication units 301 and 302 which is capable of communication. On the other hand, in a case where the process in S1114 has been carried out, the CPU 305 performs control to send the separated image data to the communication unit 301 and the communication unit 302, in parallel.

A description will now be given of how control signals and image data are communicated. FIG. 12 is a sequence diagram showing an example of a flow of a process in which control signals and image data are communicated between the image forming apparatus 100 and the print server 300. In S1201 and S1202, both the image forming apparatus 100 and the print server 300 are in an IDLE state (communication standby state). Assume that by operating the operating unit 202 of the image forming apparatus 100 in this state, the operator issues an instruction to print image data. The CPU 200 receives the print instruction. The CPU 200 generates PAGE_REQ 1001, which is a control signal, and performs control to send the PAGE_REQ 1001 in parallel from the communication units 211 and the communication unit 221. As a result of this control, the antennas 210 and 220 send a radio signal representing the PAGE_REQ 1001 to the base station B in a parallel way (S1203). The base station B subjects the received signal to a predetermined process and radiates the radio signal. The communication units 301 and 302 of the print server 300 receive the radio signal representing the PAGE_REQ 1001 from the base station B via the antennas 311 and 312 (S1204).

The data distribution unit 306 of the print server 300 judges whether or not the two communication units 301 and 302 have received the PAGE_REQ 1001 (S1205). When the result of the judgment is "YES", the data distribution unit 306 lets the flow proceed to S1207. When the result of the judgment is "NO", the data distribution unit 306 lets the flow proceed to S1206. In S1206, the CPU 305 includes, in the PAGE_SET 1000, information indicating the communication unit incapable of communication out of the two communication units. The CPU 305 generates the PAGE_SET 1000 and outputs the generated PAGE_SET 1000 to one or both of the communication units 301 and 302. When both of the communication units 301 and 302 are incapable of communication, the PAGE_SET 1000 is output to the communication units 301 and 302 in a parallel way. When one of the communication units 301 and 302 is incapable of communication, the PAGE_SET 1000 is output to the communication unit capable of communication. In S1207, one or both of the antennas 311 and 312 radiate a radio signal representing the PAGE_SET 1000. When both of the communication units 301 and 302 are capable of communication, the radio signal representing the PAGE_SET 1000 is radiated in parallel from both of the antennas 311 and 312. When one of the communication units 301 and 302 is incapable of communication, the radio signal representing the PAGE_SET 1000 is radiated from one of the antennas 311 and 312 which corresponds to the communication unit capable of communication. The process related to communication of the PAGE_REQ 1001 and the PAGE_SET 1000 in S1203 to S1208 is the same as in S1102 to S1108 in FIG. 11.

The base station B receives the radio signal (the radio signal representing the PAGE_SET 1000) radiated from the print server 300. The base station B subjects the received radio signal to a predetermined process and radiates the radio signal. The CPU 200 of the image forming apparatus 100 judges whether or not the radio signal radiated by the base station B (the radio signal representing the PAGE_SET 1000) has been received within a predetermined time period (S1208). The predetermined time period can be arbitrarily determined. When the result of the judgment in S1208 is "NO", the CPU 200 lets the flow return to S1203, in which it performs control to resend the PAGE_SET 1000.

When the result of the judgment in S1208 is "YES", the CPU 200 lets the flow proceed to S1209. Then, the CPU 200 generates ACK and performs control to send the generated ACK from both of the communication units 211 and 221. This control causes the antennas 210 and 220 to send a radio signal representing the ACK to the base station B in parallel (S1209). The base station B receives the ACK sent by the image forming apparatus 100, subjects the received ACK to a predetermined process, and radiates the ACK. The antennas 311 and 312 of the print server 300 receive the radio signal of ACK radiated by the base station B (S1211). The process related to communication of the ACK included in S1209 and S1211 is the same as in S1109 to S1111 in FIG. 11.

The process described above enables the print server 300 to send image data to the image forming apparatus 100 in response to a request from the image forming apparatus 100. The CPU 305 of the print server 300 performs control to send image data to the image forming apparatus 100 (S1212). Here, when both of the communication units 301 and 302 are capable of communication, the communication units 301 and 302 send separated image data, which is obtained by dividing the image data, to the image forming apparatus 100 via the antennas 311 and 312, in a parallel way. When one of the communication units 301 and 302 is incapable of communication, the image data is sent to the image forming apparatus 100 by the communication unit capable of communication via the corresponding antenna. The process in S1212 is the same as in S1112 to S1115 in FIG. 11.

The base station B receives a radio signal of the image data sent from the print server 300. The base station B subjects the received radio signal to a predetermined process and radiates the radio signal. The antennas 210 and 220 of the image forming apparatus 100 receive the radio signal radiated by the base station B (the radio signal of the image data) (S1213). The CPU 200 of the image forming apparatus 100 performs control to send the ACK in parallel from the communication units 211 and 221 to the print server 300 (S1214). The antennas 311 and 312 of the print server 300 receive the ACK via the base station B (S1215). The process in S1214 and S1215 is the same as in S1209 to S1211 in FIG. 11. It should be noted that the CPU 305 may carry out, in S1215, the same process as in S1205 to judge whether or not both of the antennas 311 and 312 have received the ACK.

Then, the CPU 305 of the print server 300 judges whether or not the transmission of the image data has been completed (S1216). When the result of the judgment in S1216 is "NO", the CPU 305 lets the flow return to S1212. When the result of the judgment in S1216 is "YES", the CPU 305 performs control to send an image data transmission completion notification indicating that the transmission of the image data has been completed, from the communication units 301 and 302 to the image forming apparatus 100. As a result, the image data transmission completion notification is radiated in parallel from the antennas 311 and 312 (S1217). The CPU 305 performs control to shift the state of the print server 305 to the IDLE state (S1218).

On the other hand, the communication units 211 and 221 of the image forming apparatus 100 receive, via the the base station B, the image data transmission completion notification transmitted from the print server 300 (S1219). The CPU 200 of the image forming apparatus 100 performs control to shift the state of the image forming apparatus 100 to the IDLE state (S1220).

As described above, the image forming apparatus 100 has the two communication units 211 and 221. The image forming apparatus 100 sends the control signal PAGE_REQ 1001 in parallel using the two communication units 211 and 221. The print server 300 sends the control signal PAGE_SET 1000 in parallel using the two communication units 301 and 302. Namely, between the image forming apparatus 100 and the print server 300, communication of the same control signal is carried out via respective two communication units. Communication of the control signal is carried out via 5G communication as described above. The 5G communication enables high-speed and large-volume communication, has, however, high linearity and is weak to obstacles because the 5G uses high-frequency radio waves called millimeter waves. For this reason, there is the possibility that communication between the image forming apparatus 100 and the print server 300 is temporarily disconnected.

In many cases, the image forming apparatus 100 is placed in, for example, an office environment where there are a lot of people crossing. In such cases, when a person moves between the image forming apparatus 100 and the print server 300, the person may be an obstacle which temporarily disconnects communication between the image forming apparatus 100 and the print server 300. For this reason, communication is carried out between the image forming apparatus 100 and the print server 300 each of which uses the two communication units, and hence even if communication using one of the two communication units is temporarily disconnected, communication using the other one of the two communication units is possible in many cases. As a result, the reliability of 5G communication improves, enabling the image forming apparatus to suitably carry out 5G communication.

A description will now be given of how the board is replaced. As shown in FIG. 2, the eSIM module 212, the CPU 202, the ROM 205, and so forth are mounted on the control board 240. When a component or wire mounted on the control board 240 or the control board 240 itself has failed, the control board 240 is replaced. When the control board 240 is replaced, it becomes necessary to set a new profile in the eSIM module 212. On this occasion, it is necessary to perform the authentication procedure again so as to use the mobile communication system using eSIM. A description will now be given of an example which can improve convenience of the authentication procedure in the case where the control board 240 on which the eSIM module 212 is mounted is replaced.

Figure 13A:
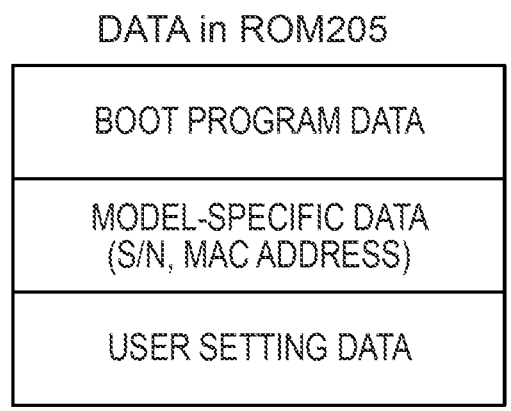
FIGS. 13A to 13D are views showing examples of data stored in respective nonvolatile memories in a first embodiment.
Figure 13B:
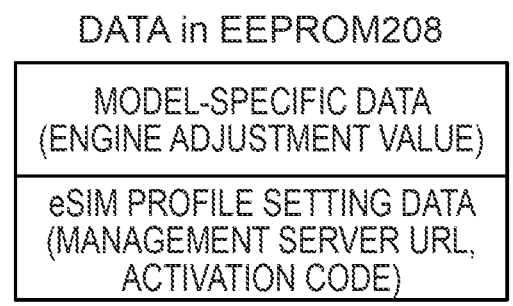

FIGS. 13A to 13D are views showing examples of data stored in respective nonvolatile memories in the first embodiment. The ROM 205, the EEPROM 208, the FeRAM 209, and the eSIM module 212 shown in FIGS. 13A to 13D are nonvolatile memories. FIG. 13A shows an example of the data stored in the ROM 205. Boot program data is comprised of data of a boot program for starting the CPU 200. Model-specific data is data about a serial number (S/N), which uniquely identifies the image forming apparatus 100, and a MAC address of a network. User setting data is data about operation settings designated by the user such as a power-off timer setting and an image quality setting for printing. FIG. 13B shows an example of the data stored in the EEPROM 208. The model-specific data is comprised of engine adjustment values for adjusting characteristics varying with individual the image forming apparatus 100. The engine adjustment values include, for example, values relating to various types of adjustments such as an offset value for a writing start position of a laser scanner. eSIM profile setting data is data including the URL of the management server MS and the activation code.

Figure 13C:
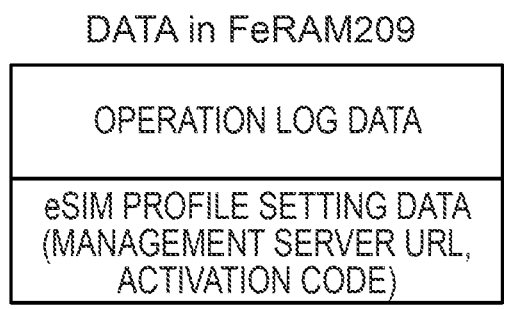
Figure 13D:
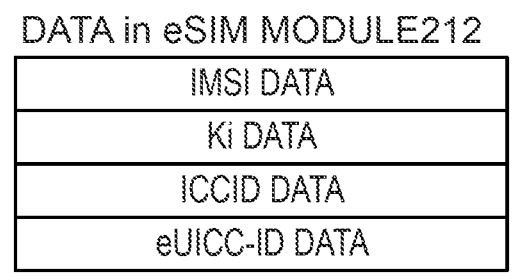

FIG. 13C shows an example of the data stored in the FeRAM 209. Operation log data is system log data on the image forming apparatus 100. The operation log data is data of which content is referred to at the time of, for example, maintenance. eSIM profile setting data is the same as the data stored in the EEPROM 208. The eSIM profile setting data may be stored in either one or both of the EEPROM 208 and the FeRAM 209. FIG. 13D shows an example of the data stored in the eSIM module 212. IMSI data is an identifier assigned to for each line. Ki data is a network authentication key. ICCID data is an identifier that identifies an eSIM profile, and one piece of ICCID data is assigned to each profile. eUICC-ID data is an identifier that identifies an eSIM, and one piece of eUICC-ID data is assigned to each eSIM. Each piece of data in FIG. 13D is a profile and is connection information for use in connecting the image forming apparatus 100 to the mobile communication system.

Figure 14:
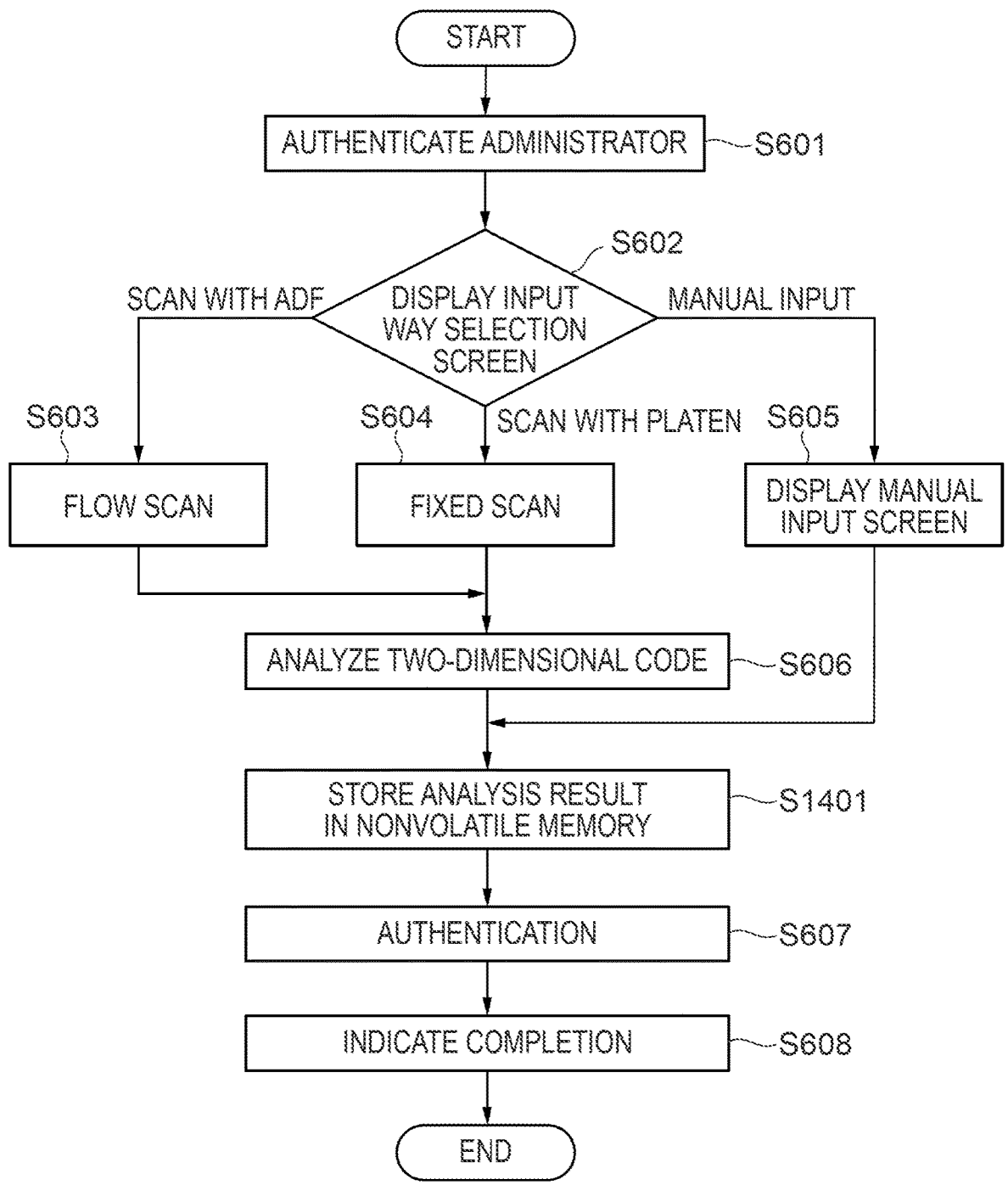
FIG. 14 is a flowchart showing an example of a flow of a re-authentication process carried out in a case where a control board has been replaced.

FIG. 14 is a flowchart showing an example of a flow of a re-authentication process that is carried out in a case where the control board 240 has been replaced. Processes in S601 to S608 are the same as those in FIG. 6, and hence description thereof is omitted. In the re-authentication process in FIG. 14, the CPU 200 of the image forming apparatus 100 analyzes the two-dimensional code in S606 and then lets the flow proceed to S1401. In S1401, the CPU 200 stores the URL of the management server MS and the activation code, which were recognized by analysis, as the SIM profile setting data into the EEPROM 208. At this time, the CPU 200 may store the SIM profile setting data into the FeRAM 209.

A description will now be given of a process carried out at the start of the image forming apparatus 100 in a case where the control board 240 or the eSIM module 212 has been replaced. FIG. 15 is a flowchart showing an example of a flow of a process carried out at the start of the image forming apparatus in a case where the control board 240 has been replaced. The process in the flowchart of FIG. 15 is started after the power to the image forming apparatus 100 is turned on after the replacement of the control board 240. Based on the profile in the eSIM module 212, the CPU 200 carries out a series of processes related to authentication of device information (information about the image forming apparatus 100) (S1501). On this occasion, the CPU 200 carries out communication with the management server MS and carries out the series of processes related to authentication of the image forming apparatus 100, via the base station B. When the authentication of the image forming apparatus 100 has been performed, the CPU 200 obtains information indicating whether or not the authentication is successful from the management server MS.

The CPU 200 judges whether or not the authentication of the device information is successful (S1502). When the profile read from the eSiM module 212 is valid, the authentication by the management server MS is successful. In this case, the CPU 200 judges the result of the judgment as "YES" in S1502, and ends the process in the flowchart of FIG. 15. On the other hand, when the control board 240 on which the eSiM module 212 is mounted has been removed and replaced with a new control board 240, authentication by the management server MS based on a profile read from a new eSiM module 212 mounted on the new control board 240 is unsuccessful. In this case, the CPU 200 judges the result of the judgment is "NO" in S1502, and displays a recovery screen on the operating unit 202.

Figure 16A:
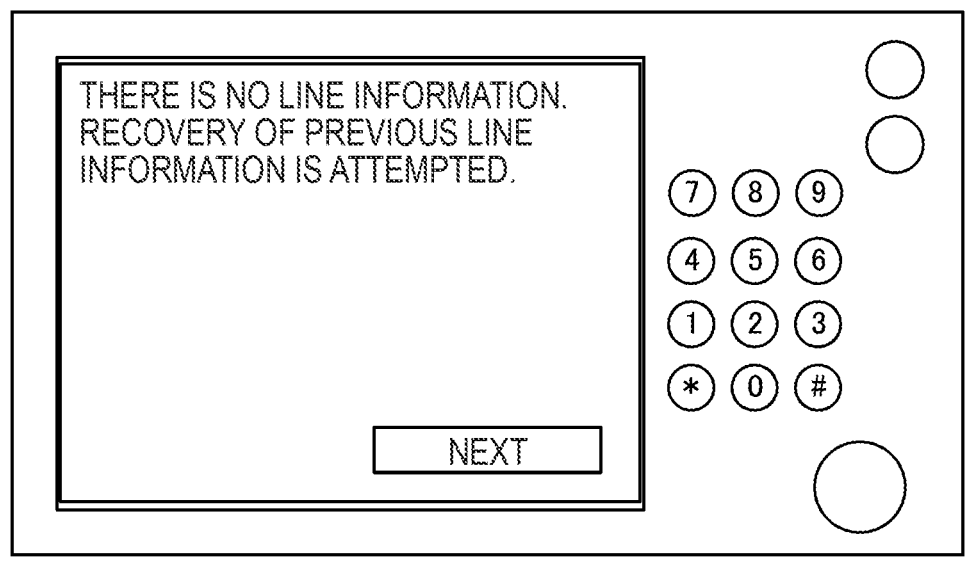
FIGS. 16A to 16B are views showing examples of recovery screens.
Figure 16B:
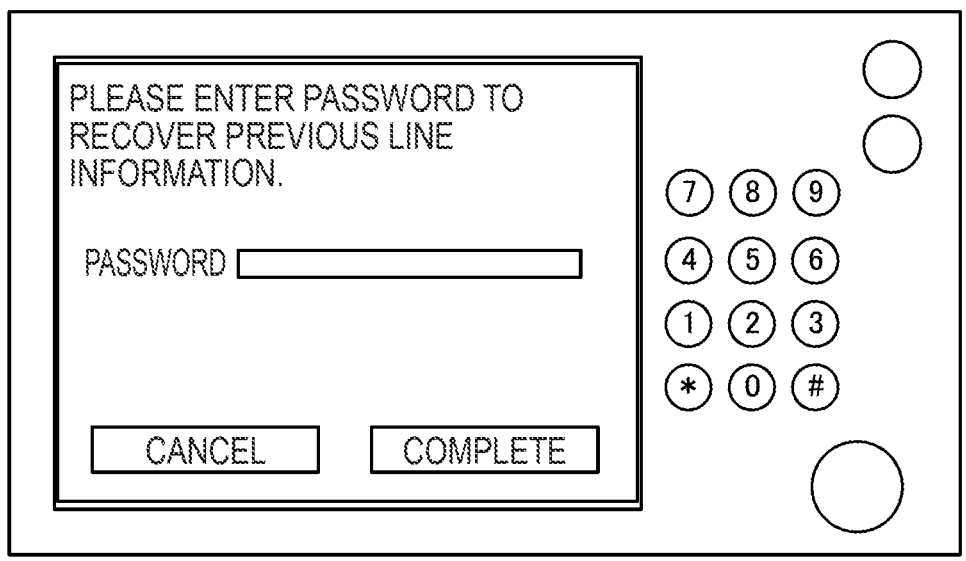

FIGS. 16A to 16B are views showing examples of the recovery screen. FIG. 16A shows an example of the recovery screen displayed when line information being recovered. The CPU 200 displays a message shown in FIG. 16A on the operating unit 202. When a "Next" button displayed on the operating unit 202 is operated, the CPU 200 accepts the operation on the button. The CPU 200 reads the eSIM profile setting data stored in the EEPROM 208 (S1504). The eSIM profile setting data stored in the EEPROM 208 includes the URL of the management server MS and the activation code before the replacement of the control board 240. By using the URL of the management server MS and the activation code that have been read, the CPU 200 carries out an activation process for requesting to obtain again a profile (S1505). When the activation process has been carried out, the profile is downloaded (reobtained) from the management server MS to rewrite the profile in the eSIM module 212. This enables the image forming apparatus 100 to communicate with the network 250 via the base station B.

Thus, authentication for using the mobile communication system using eSIM is automatically performed even if the control board 240 on which the eSIM module 212 is mounted has been replaced. As a result, even if the control board 240 on which the eSIM module 212 is mounted has been replaced, there is no need to manually perform authentication, and hence authentication is simplified to improve convenience. This enables the image forming apparatus 100 to suitably carry out 5G communication.

It should be noted that in S1503, the CPU 200 may perform control to display a screen shown in FIG. 16B on the operating unit 202. FIG. 16B shows an example of the recovery screen that requests input of a password when line information is to be recovered. When the password is input while the screen in FIG. 16B is being displayed on the operating unit 202, the CPU 200 performs control to send the management server MS a request that the management server MS judge whether or not the input (received) password is valid. The management server MS judges whether or not the received password is valid and sends the result of the judgment to the image forming apparatus 100. When the result of the judgment received from the management server MS indicates that the received password is not valid, the CPU 200 of the image forming apparatus 100 prohibits the flow from proceeding to S1504. This prevents recovery of line information by an unauthorized user, and improves security. As a result, the image forming apparatus 100 can suitably carry out 5G communication.

Although, in the example described above, the image forming apparatus 100 has the two communication units 211 and 221, the image forming apparatus 100 may have only one communication unit. Since the image forming apparatus 100 has the reading apparatus 201, and the CPU 200 reads the two-dimensional code described above and carries out the authentication-related process, the authentication procedure for using the mobile communication system using eSIM is simplified. In this case, the image forming apparatus 100 may have only one communication unit. However, from the viewpoint of improving reliability of 5G communication, it is preferred that the image forming apparatus 100 has the two communication units 211 and 221 to send control signals in parallel.

Moreover, the image forming apparatus 100 may have two or more eSIM modules 212, each having different profiles. For example, when the two communication units 211 and 221 send different data, the CPU 200 may read profiles from the eSIM modules 212 respectively corresponding to the communication units 211 and 221, and send the data via 5G communication. Furthermore, although in the example described above, the image forming apparatus 100 has the eSIM module 212 and the SIM connector 213, the image forming apparatus 100 may be configured to have only one of the eSIM module 212 and the SIM connector 213.

A description will now be given of a second embodiment. In the second embodiment, arrangements of the image forming apparatus 100 and the print server 300 are the same as those in the first embodiment, and hence description thereof is omitted. As described above, a profile for connecting to the mobile communication unit is stored in the eSIM module 212. The control board 240 on which the eSIM module 212 is mounted may, for example, be replaced, and also, the control board 240 may be stolen and misappropriated. If an unauthorized third party obtains the control board 240 and the eSIM module 212 and attaches them to another image forming apparatus, the profile stored in the eSIM modules 212 may be misappropriated. In this case, the another image forming apparatus can make unauthorized access to the mobile communication unit by misappropriating the profile. The second embodiment solves this problem.

Figure 17A:
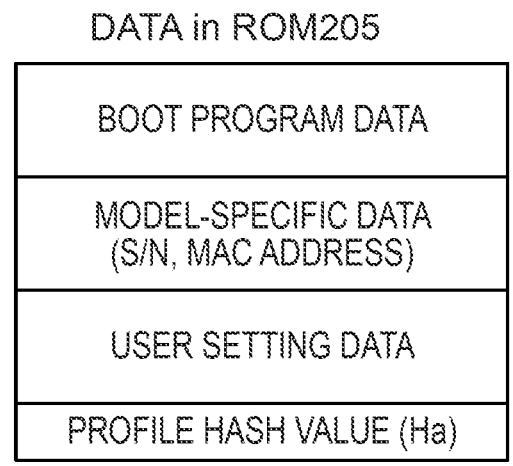
FIGS. 17A to 17D are views showing examples of data stored in respective nonvolatile memories in a second embodiment.

FIGS. 17A to 17D are views showing examples of data stored in the respective nonvolatile memories in the second embodiment. FIG. 17A shows an example of data stored in the ROM 205. The example of the data in FIG. 17A differs from the example of the data in FIG. 13A in that the data in FIG. 17A includes a profile hash value. The other various types of data are the same as those in FIG. 13A. The profile hash value is a hash value obtained using a hash function by using one or multiple pieces of data stored in the eSIM module 212 as a key. The profile hash value is written at a startup process, which will be described later. In the following description, the profile hash value stored in the ROM 205 is denoted by "Ha".

Figure 17B:
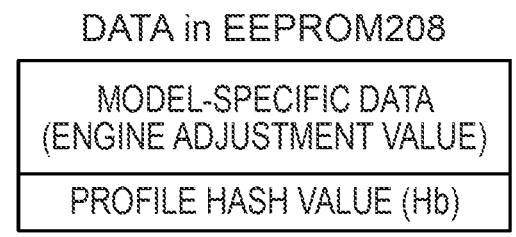
Figure 17C:
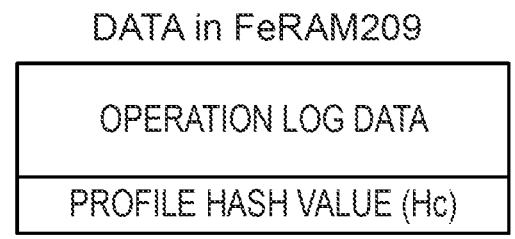
Figure 17D:
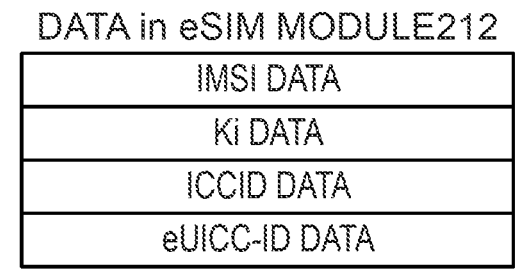

FIG. 17B shows an example of data stored in the EEPROM 208. Model-specific data is the same as the model-specific data in FIG. 13B. A profile hash value as well as the model-specific data is stored in the EEPROM 208. In the following description, the profile hash value stored in the EEPROM 208 is denoted by "Hb". In the example shown in FIG. 17B, the eSIM profile setting data in FIG. 13B may be stored in the EEPROM 208. FIG. 17C shows an example of data stored in the FeRAM 209. Operation log data is the same as the operation log data in FIG. 13C. A profile hash value as well as the operation log data is stored in the FeRAM 209. In the following description, the profile hash value stored in the FeRAM 209 is denoted by "Hc". In the example shown in FIG. 17C, the eSIM profile setting data in FIG. 13C may be stored in the FeRAM 209. FIG. 17D shows an example of data stored in the eSIM module 212. The eSIM module 212 corresponds to "one nonvolatile memory", and the ROM 205, the EEPROM 208, and the FeRAM 209 correspond to "the other nonvolatile memory (ies)".

Various types of data in FIG. 17D are the same as the various types of data in FIG. 13D. The profile hash value described above is obtained using the various types of data in FIG. 17D and a hash function. Here, data used as a key may be either a part or all of the various types of data in FIG. 17D. For example, two data consisting of eUICC-ID data and ICCID data may be used as keys. In this case, a hash value obtained using a combination of eUICC-ID data and ICCID data is the profile hash value.

Referring to the flowchart of FIG. 14, instead of carrying out the process in S1401, the CPU 200 obtains the profile hash values Ha, Hb, and Hc from the obtained profile and stores the obtained profile hash values Ha, Hb, and Hc in the ROM 205, the EEPROM 208, and the FeRAM 209. It should be noted that the CPU 200 may store the profile itself, instead of the profile hash value, in the eSIM module 212 as well as in the ROM 205, the EEPROM 208, and the FeRAM 209 as well. In this case, the same profile as the profile stored in the eSIM module 212 is stored in the ROM 205, the EEPROM 208, and the FeRAM 209.

Figure 18:
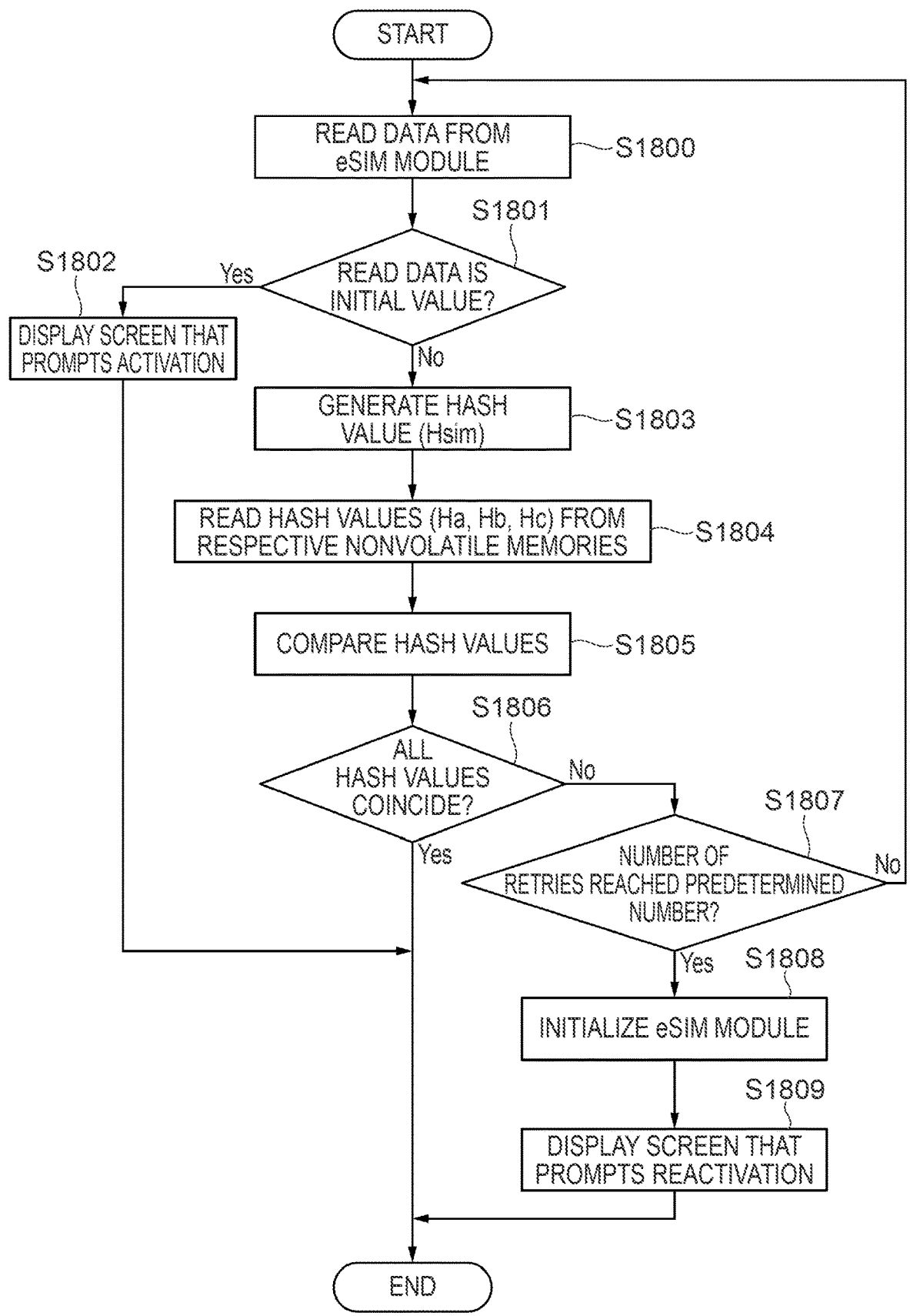
FIG. 18 is a flowchart showing an example of a flow of a process carried out when the image forming apparatus has been started.

FIG. 18 is a flowchart showing an example of a flow of the startup process carried out when the image forming apparatus 100 has been started. When the power to the image forming apparatus 100 is turned on, the startup process is carried out. The CPU 200 may carry out the startup process before the process in S500 in FIG. 5 is started. The startup process is a process for checking integrity of data stored in the ROM 205, the EEPROM 208, the FeRAM 209, and the eSIM module 212.

Figure 19A:
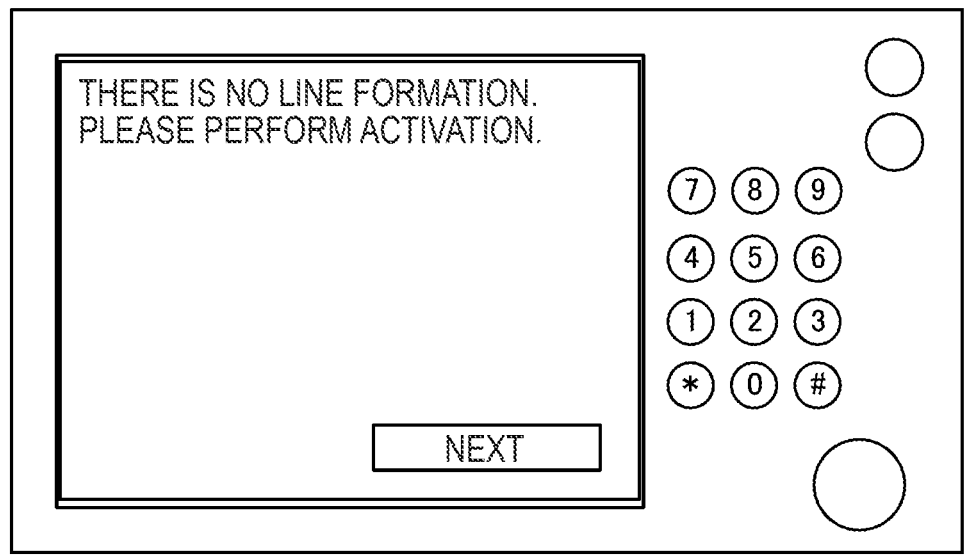
FIGS. 19A and 19B are views showing examples of screens displayed on the operating unit in the second embodiment.

The CPU 200 reads data such as an IMSI and an ICCID from the eSIM module 212 (S1800). The CPU 200 judges whether or not the read data is an initial value (S1801). The read data being the initial value means that activation has not been performed. When the read data is the initial value, the CPU 200 judges the result of the judgment as "YES" in S1801, and lets the flow proceed to S1802. In S1802, the CPU 200 performs control to display a screen that prompts activation on the operating unit 202. FIG. 19A shows an example of the screen that prompts activation. When a "Next" button is operated on the screen in FIG. 19A, the CPU 200 ends the process in the flowchart of FIG. 18.

When judging as "NO" in S1801, the CPU 200 lets the flow proceed to S1803. The CPU 200 generates a hash value using the data read in S1800 as a key (S1803). The CPU 200 generates the hash value applying an arbitrary hash function (for example, SHA-2, SHA-3). The CPU 200 generates the hash value using the same data as the data used in generating the profile hash values Ha, Hb, and Hc described above. For example, in a case where eUICC-ID data and ICCID data were used to generate the profile hash values Ha, Hb and Hc, the CPU 200 generates the hash value using the eUICC-ID data and ICCID data in S1803. In the following description, the hash value generated in S1803 is denoted by "Hsim".

Then, the CPU 200 reads the profile hash values Ha, Hb and Hc from the ROM 205, the EEPROM 208 and the FeRAM 209, respectively (S1804). The CPU 200 compares the hash value Hsim generated in S1803 with the profile hash values Ha, Hb and Hc read in S1804 (S1805). The CPU 200 judges whether or not all of the profile hash values Ha, Hb and Hc coincide with the hash value Hsim (S1806). When there is any hash value that does not coincide with the hash value Hsim, the CPU 200 judges as "NO" in S1806, and lets the flow proceed to S1807. On the other hand, when all of the profile hash values Ha, Hb and Hc coincide with the hash value Hsim, the CPU 200 ends the process in the flowchart of FIG. 18.

In S1807, the CPU 200 judges whether or not the number of retries of the startup process has reached a predetermined number of times. The predetermined number of times can be set to an arbitrary number of times such as "three times".

When the number of retries of the startup process has not reached the predetermined number of times, the CPU 200 judges as "NO" in S1807, and lets the flow return to S1800. As a result, the startup process is retried again. For example, in a case where the predetermined number of times is set to three times, the startup process is allowed to be retried up to three times.

Figure 19B:
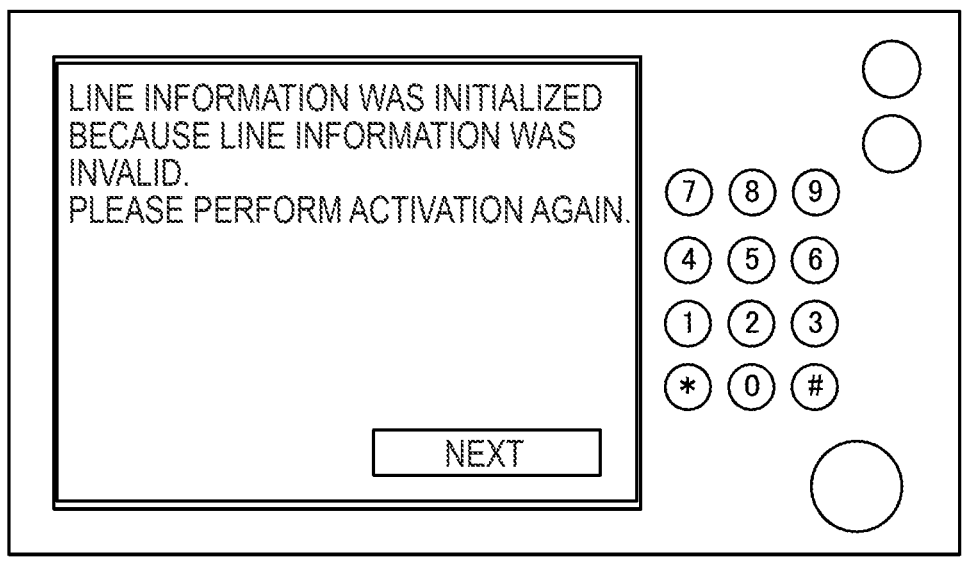

On the other hand, when the number of retries of the startup process has reached the predetermined number of times, the CPU 200 judges as "YES" in S1807, and lets the flow proceed to S1808. When it has been judged the predetermined number of times that the hash values do not coincide, it is supposed that the eSIM module 212 mounted on the control board 240 is in an invalid state. For this reason, the CPU 200 initializes the eSIM module 212 (S1808). In S1808, the CPU 200 may delete the profile in the eSIM module 212 instead of initializing the eSIM module 212. Namely, the CPU 200 deletes the profile in S1808. As another alternative, when judging as "YES" in S1807, the CPU 200 may forcibly end the startup process. Thus, when the eSIM module 212 is invalid, use of the image forming apparatus 100 can be prohibited. Then, the CPU 200 performs control to display, on the operating unit 202, a screen that prompts the operator to perform reactivation (S1809). FIG. 19B shows an example of the screen that prompts the operator to perform activation. The CPU 200 carries out the process in S1809 and then ends the process in the flowchart of FIG. 18.

It should be noted that although in the process in FIG. 18, the CPU 200 judges whether or not to initialize the eSIM module 212 based on the hash value, the CPU 200 may make this judgment based on the profile itself instead of the hash value. For example, the CPU 200 may judge whether or not the profiles stored in the eSIM module 212 coincide with the profiles stored in the ROM 205, the EEPROM 208, and the FeRAM 209. Then, the CPU 200 may perform control to initialize the eSIM module 212 according to the result of the judgment as to whether or not the profiles coincide.

As described above, in the second embodiment, the profile stored in the eSIM module 212 is stored in the nonvolatile memories such as the ROM 205, the EEPROM 208, and the FeRAM 209. The CPU 200 judges whether or not the respective profiles stored in the ROM 205, the EEPROM 208, and the FeRAM 209 are consistent with the profile stored in the eSIM module 212. When the CPU 200 judges that the profiles are not consistent with each other, the CPU 200 deletes the profile in the eSIM module 212. According to this arrangement, even if the control board 240 on which the eSIM module 212 is mounted is removed from the image forming apparatus 100 and attached to another image forming apparatus, the profile in this eSIM module 212 is not consistent with the one in the other image forming apparatus, and hence the profile in this eSIM module 212 is initialized. As a result, even if the control board 240 on which the eSIM module 212 is mounted is stolen, the profile in this eSIM module 212 of the image forming apparatus 100 is prevented from being misappropriated by an unauthorized third party. As a result, unauthorized connection to the mobile communication system using the above profile is avoided, and hence security is improved.

Moreover, as compared to mobile terminals such as smartphones and tablet terminals, the image forming apparatus 100 is large in size and incorporates a plurality of boards. For example, the mobile terminals have no allowance for incorporating a plurality of nonvolatile memories on which profiles for use in judging the consistency of profiles, whereas the image forming apparatus 100 has this allowance. From this standpoint, the present embodiment is particularly useful for the image forming apparatus 100.

It should be noted that the profile hash values for use in judging the consistency of the profiles described above may be stored in two or less nonvolatile memories or may be stored in four or more nonvolatile memories. For example, the CPU 200 may make the judgment in S1806 using the profile hash value stored in the EEPROM 208. The CPU 200 may also make the judgment as to whether or not the profile in the eSIM module 212 and the profiles in the nonvolatile memories are consistent with each other using an arbitrary method other than the method using the hash values.

A description will now be given of a third embodiment. In the third embodiment, arrangements of the image forming apparatus 100 and the print server 300 are the same as those in the first embodiment, and hence description thereof is omitted. As described above, the SIM connector 213 is connected to the control board 240. As distinct from eSIM, a SIM card connected to the SIM connector 213 is a nonvolatile memory on which a profile cannot be rewritten. As distinct from the eSIM module 212 mounted on the control board 240, the SIM card can be easily removed from the image forming apparatus 100. A profile is stored on the SIM card, and hence misappropriation of the SIM card could make unauthorized connection to the mobile communication system possible with the profile stored on the SIM card.

When the SIM card is unauthorizedly removed from the SIM connector 213 of the image forming apparatus 100, it may take a long time until the administrator of the image forming apparatus 100 recognizes that the unauthorized removal of the SIM card if only a warning is displayed on the operating unit 202. For this reason, the third embodiment aims to shorten the time required to notify and warn the administrator of the unauthorized removal of the SIM card from the image forming apparatus 100.

Figure 20A:
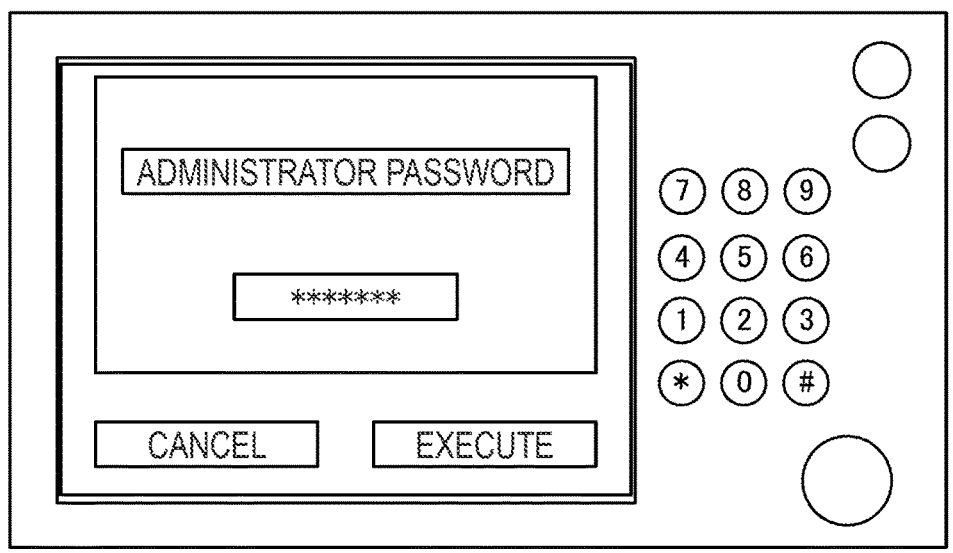
FIGS. 20A to 20C are views showing examples of screens displayed when a SIM card is to be removed.
Figure 20B:
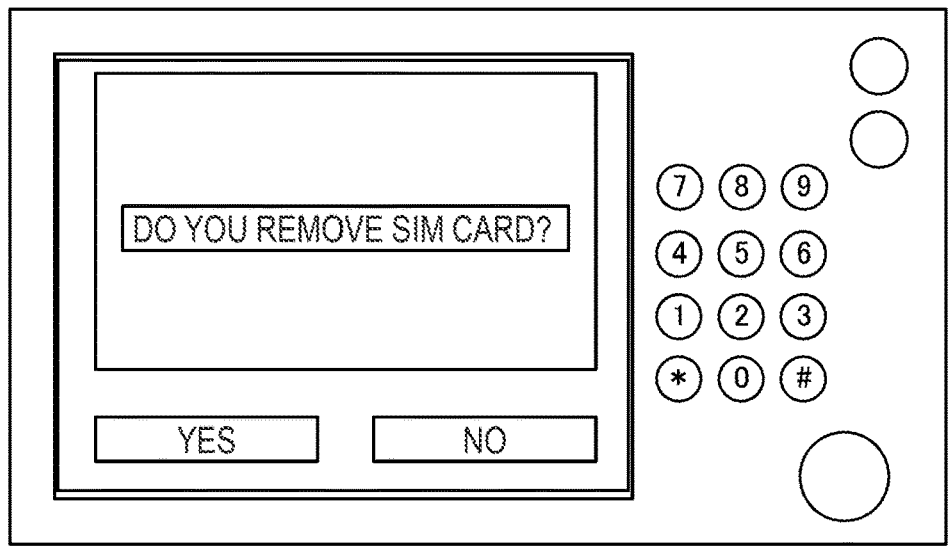
Figure 20C:
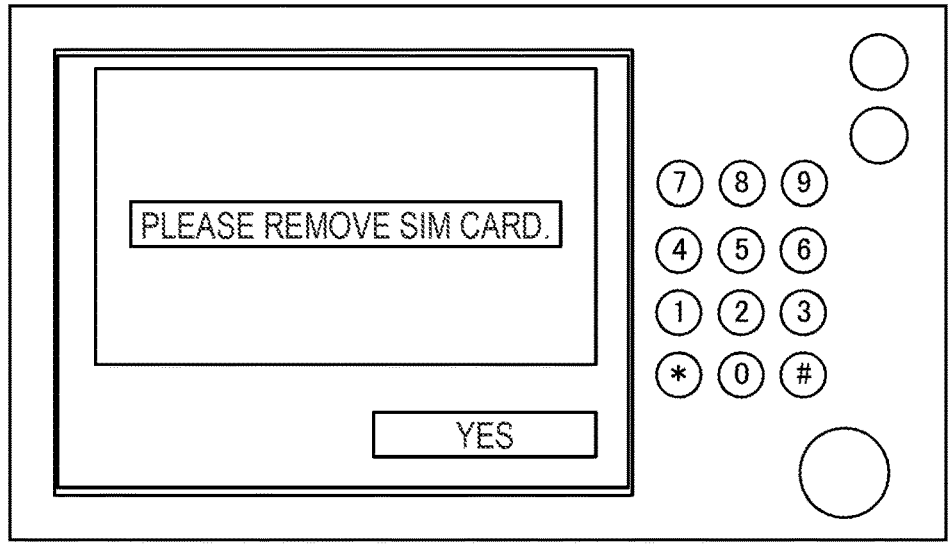

First, a description will be given of an example of a case where the SIM card is normally removed from the SIM connector 213 with the power to the image forming apparatus 100 on. FIGS. 20A to 20C are views showing examples of screens displayed when the SIM card is removed. Upon detecting that the SIM card is normally removed from the SIM connector 213, the CPU 200 performs control to display, on the operating unit 202, a screen that prompts input of an administrator password. FIG. 20A shows an example of the screen that prompts input of the administrator password. When the operator performs an operation to input the administrator password on the operating unit 202, the CPU 200 receives this operation.

When the input administrator password is a valid password, the CPU 200 performs control to display a screen asking whether or not to remove the SIM card on the operating unit 202. FIG. 20A shows an example of the screen asking whether or not to remove the SIM card. When the operator performs an operation to select a "Yes" button, the CPU 200 receives this operation. Then, the CPU 200 stops communicating with the SIM card and stops supply of power to the SIM connector 213. After that, the CPU 200 performs control to display a screen that gives an instruction to remove the SIM card on the operating unit 202. FIG. 20C shows an example of the screen that gives an instruction to remove the SIM card. This enables removal of the SIM card from the image forming apparatus 100. In this case, the SIM card is normally removed, and hence the CPU 200 performs a normal operation without issuing a warning.

Figure 21:
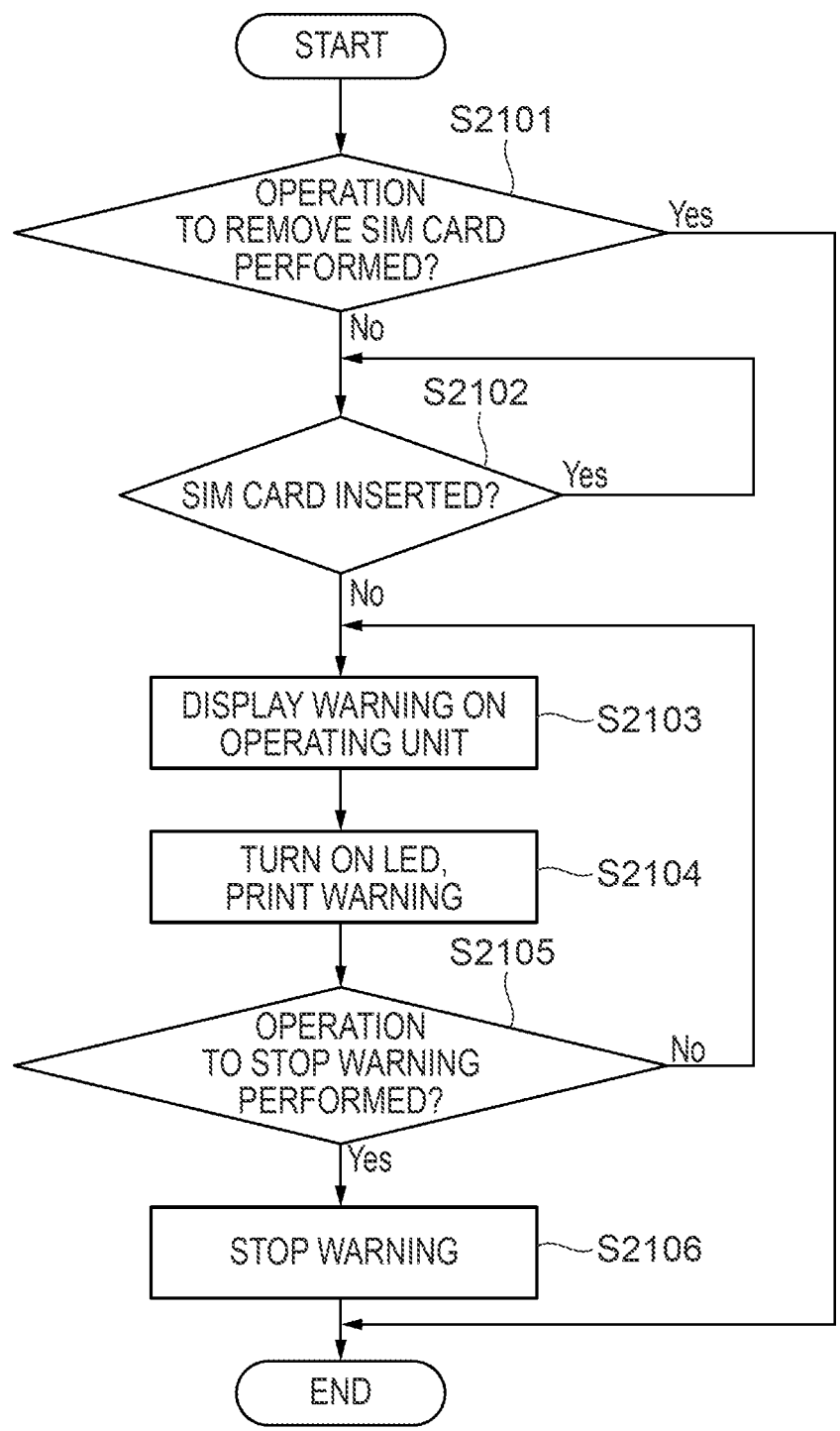

A description will be given of a case where the SIM card is unauthorizedly removed from the SIM connector 213 with the power to the image forming apparatus 100 on. FIG. 21 is a flowchart showing an example of a flow of a warning process carried out with the power on. The CPU 200 judges, whether or not the SIM card has been removed in the manner described in descriptions for FIGS. 20A to 20C (S2101). When judging as "YES" in S2101, the CPU 200 ends the process in the flowchart of FIG. 21 because the SIM card has been normally removed with the power to the image forming apparatus 100 on.

When judging as "NO" in S2101, the CPU 200 lets the flow proceed to S2102. When the power to the image forming apparatus 100 is on, the CPU 200 communicates with the SIM card, which is connected to the SIM connector 213, at regular time intervals (for example, at intervals of one second). In S2102, the CPU 200 judges whether or not the SIM card is inserted in the SIM connector 213. The CPU 200, which communicates with the SIM card at the regular time intervals as described above, reads an IMSI from the SIM card. When the IMSI is valid information, the CPU 200 judges as "YES" in S2102, and lets the flow return to S2102, and continues the normal operation of the image forming apparatus 100. The CPU 200 may judge whether or not the IMSI read from the SIM card is valid information by collating it with an IMSI stored in, for example, the eSIM module 212 or FeRAM 209.

Figure 22A:
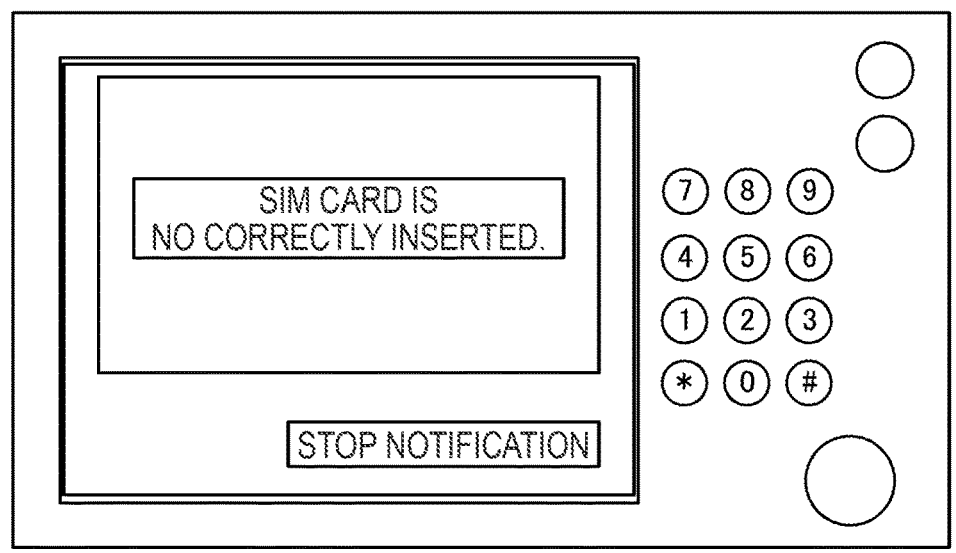
FIGS. 22A to 22C are views showing examples of screens displayed on the operating unit in a third embodiment.

When the SIM card has been removed with the power to the image forming apparatus 100 on without the above-described SIM card removal operation being performed, it becomes impossible for the CPU 200 to read valid IMSI information. In this case, the CPU 200 recognizes that the SIM card has been unauthorizedly removed, and judges as "NO" in S2102. Then, the CPU 200 performs control to display a warning screen indicating that the SIM card is not normally inserted in the operating unit 202 (S2103). FIG. 22A shows an example of the warning screen indicating that the SIM card is not normally inserted.

Then, as shown in FIG. 21, the CPU 200 turns on (or blinks) the LED 228 and controls the image forming unit 204 to print a warning (S2104). The CPU 200 may issue a warning by turning on (or blinking), instead of the LED 228, a predetermined illumination device provided in the image forming apparatus 100, for example, a LED provided in the operating unit 202. By lighting the LED 228, it is possible to notify the administrator of the image forming apparatus 100 of that the SIM card has been unauthorizedly removed. Also, by printing a warning, it is possible to notify the administrator of the image forming apparatus 100 of that the SIM card has been unauthorizedly removed. At this time, it is preferred that the warning is printed on a sheet with its printing surface facing up. The warning is printed at predetermined time intervals (for example, at intervals of 30 minutes). In S2104, it is preferred for the CPU 200 to light the LED 228 and also to print the warning. As a result, the administrator of the image forming apparatus 100 can be warned more quickly and more reliably that the SIM card has been unauthorizedly removed. However, the CPU 200 may perform one of turn on the LED 228 or print the warning.

Figure 22B:
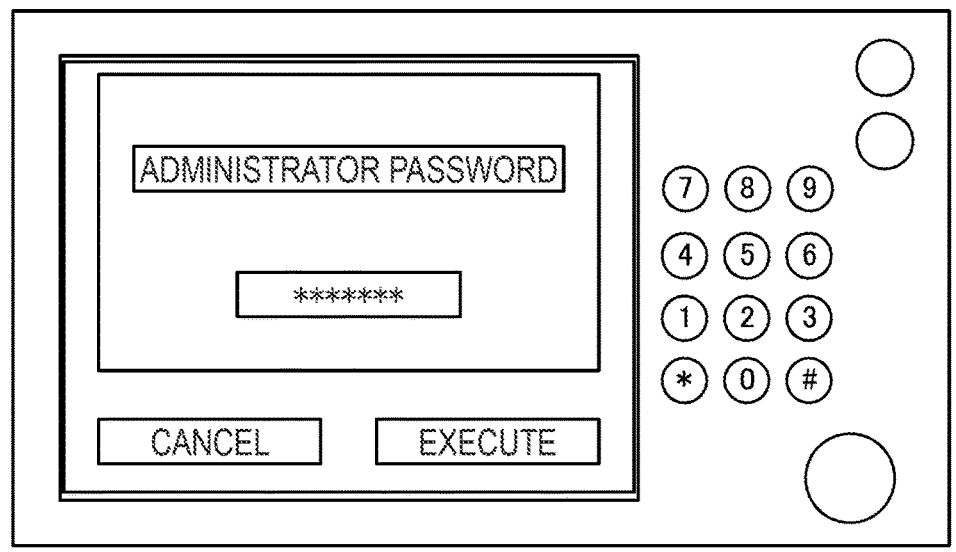
Figure 22C:
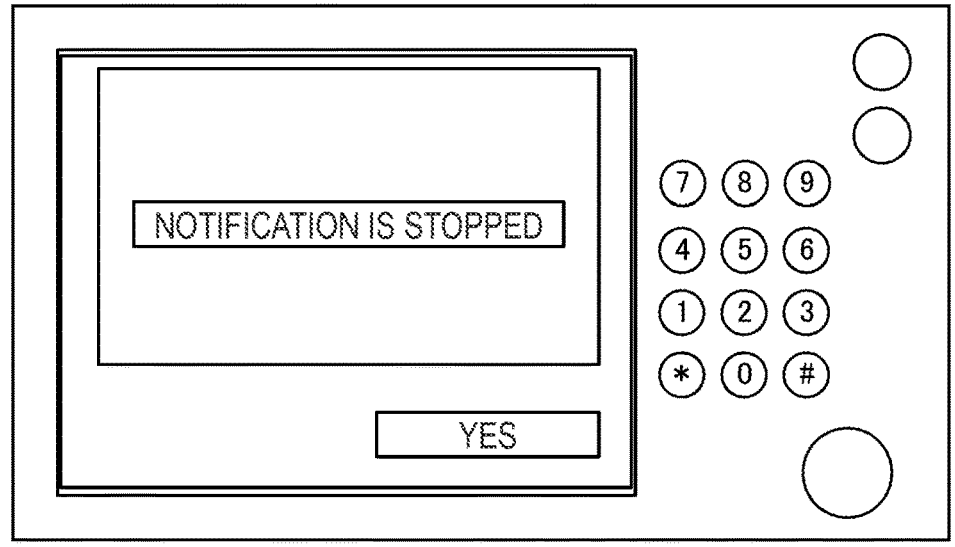

In S2105, the CPU 200 judges whether or not an operation to stop warning has been performed. At this time, the CPU 200 performs control to display a screen that prompts an operator to input of an administrator password, on the operating unit 202. FIG. 22B shows an example of the screen that prompts an operator to input of the administrator password. When the operator performs an operation to input the administrator password on the operating unit 202, the CPU 200 receives this operation. When the input administrator password is a valid password, the CPU 200 displays a message showing that warning (notification) is to be stopped. FIG. 22C shows an example of a screen indicating the message showing that warning (notification) is to be stopped. Then, the CPU 200 performs control to stop warning (S2106). This control stops turning-on of the LED 228 or printing of the warning.

Figure 23:
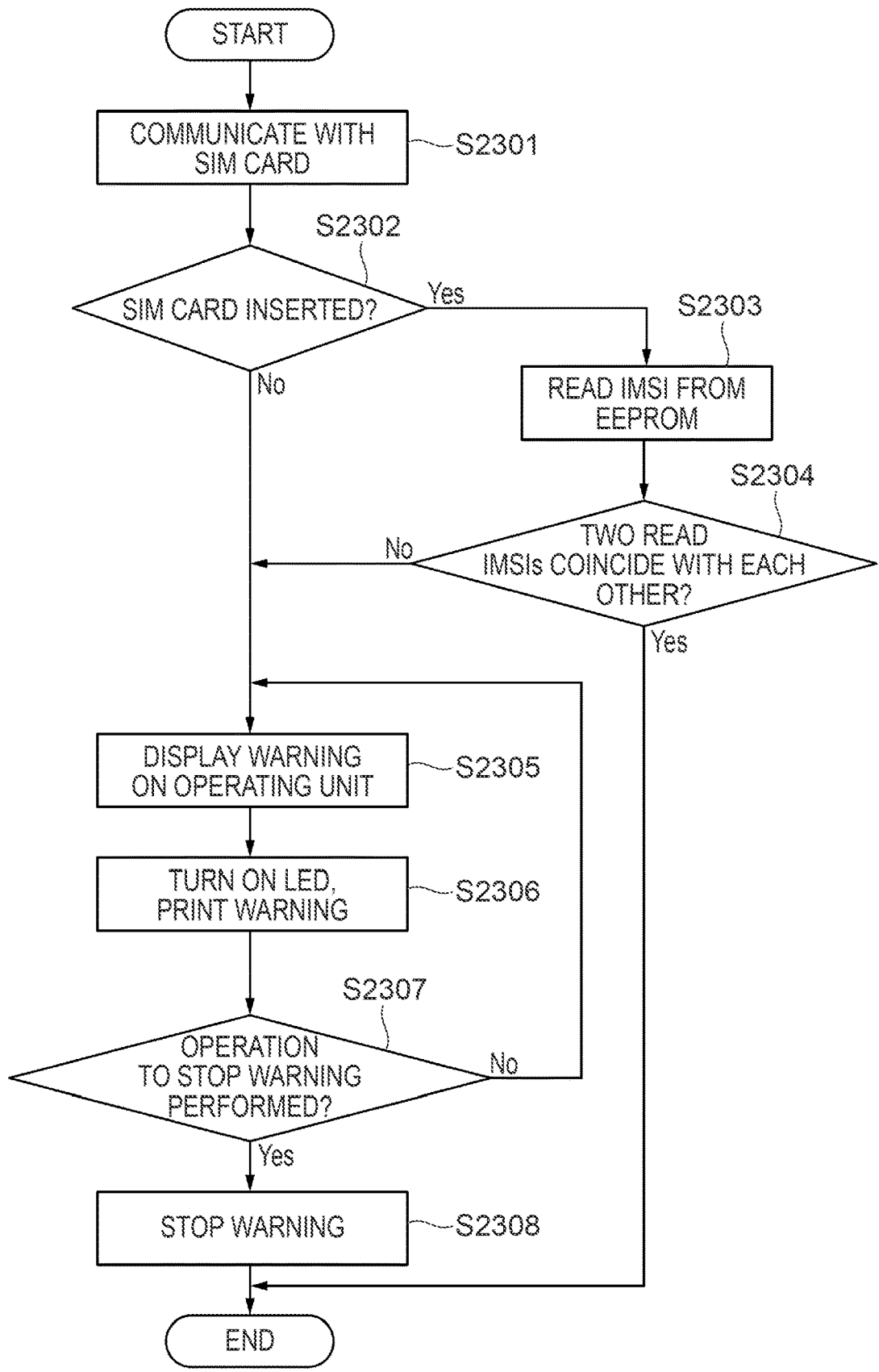
FIG. 23 is a flowchart showing an example of a flow of a warning process carried out in a case where the SIM card has been removed with the power off.

A description will now be given of a case where the SIM card has been unauthorizedly removed from the SIM connector 213 with the power to the image forming apparatus 100 off. FIG. 23 is a flowchart showing an example of a flow of a warning process performed in the case where the SIM card has been removed with the power off. The process in the flowchart of FIG. 23 is started after the image forming apparatus 100 that has been off is turned on. In S2301, the CPU 200 communicates with the SIM card in the SIM connector 213. At this time, the CPU 200 reads the IMSI from the SIM card.

The CPU 200 judges whether or not the SIM card is inserted in the SIM connector 213 (S2302). The process in S2302 is the same as the process in S2102 in FIG. 21. When judging as "YES" in S2302, the CPU 200 reads an IMSI stored in the EEPROM 208, which is the nonvolatile memory (S2303). It should be noted that the CPU 200 may read an IMSI from the ROM 205 or FeRAM 209 which is the nonvolatile memory.

The CPU 200 judges whether or not the IMSI read from the SIM card coincides with the IMSI read from the EEPROM 208 (S2304). The IMSI of the SIM card before the power is turned off is stored in the EEPROM 208. When the IMSI read from the EEPROM 208 in S2303 and the IMSI read from the SIM card in S2301 coincide with each other, this means that the SIM card was not removed. For this reason, when the CPU 200 judges the two IMSIs that have been read coincide with each other (YES in S2304), the CPU 200 ends the process in the flowchart of FIG. 23 and causes the image forming apparatus 100 to continue the normal process.

On other hand, when the IMSI read from the EEPROM 208 in S2303 and the IMSI read from the SIM card in S2301 does not coincide with each other, this means that the SIM card was removed while the image forming apparatus 100 was off. In this case, the CPU 200 recognizes that the SIM card was unauthorizedly removed while the image forming apparatus 100 was off. Thus, when the CPU 200 judges the two IMSIs that have been read do not coincide with each other (NO in S2304), the CPU 200 lets the flow proceed to S2305. The processes in S2305 to S2308 are the same as those in S2104 to S2106 in FIG. 21. Namely, the image forming apparatus 100 issues a warning by turning on the LED 228 and/or printing a warning. As a result, the image forming apparatus 100 can quickly warn the administrator that the SIM card was unauthorizedly removed while the image forming apparatus 100 was off. It should be noted that in the third embodiment, the warning may be issued by making a sound, for example, from the speaker 242.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-176689, filed Oct. 21, 2020, which is hereby incorporated by reference herein in its entirety.

What is claimed is:

1. An image forming system including an image processing apparatus and an image forming apparatus, comprising:
a memory device that stores a set of instructions; and
at least one processor that executes the set of instructions,
the image processing apparatus comprising:
a first controller;
a first millimeter wave communication interface; and
a second millimeter wave communication interface, and
the image forming apparatus comprising:
a second controller;
a third millimeter wave communication interface; and
a fourth millimeter wave communication interface,
wherein the first controller outputs control information, which is used to carry out an image forming process in which the image forming apparatus forms an image on a sheet based on image data generated by the image processing apparatus, from the first millimeter wave communication interface and the second millimeter wave communication interface, and
the second controller
receives the output control information via the third millimeter wave communication interface and the fourth millimeter wave communication interface, and
outputs response information, which is a response to the received control information, from the third millimeter wave communication interface and the fourth millimeter wave communication interface, and sends the response information to the image processing apparatus.

2. The image forming system according to claim 1, wherein
each of the first to fourth millimeter wave communication interfaces connects to a mobile communication system and carries out communication;
the first millimeter wave communication interface and the second millimeter wave communication interface are configured to output the control information in parallel; and
the third millimeter wave communication interface and the fourth millimeter wave communication interface are configured to receive the control information in parallel and to output the response information in parallel.

3. The image forming system according to claim 1, wherein in a case where a millimeter wave communication interface which has not received the control information is found out of the third millimeter wave communication interface and the fourth millimeter wave communication interface, it is judged that the found millimeter wave communication interface is a millimeter wave communication interface incapable of communication, and
in a case where there is the millimeter wave communication interface incapable of communication, the second controller outputs the response information using only the millimeter wave communication interface that is not the millimeter wave communication interface incapable of communication, wherein information regarding the millimeter wave communication interface incapable of communication is included in the response information.

4. The image forming system according to claim 1, wherein each of the first to fourth millimeter wave communication interfaces carry out communication using millimeter waves.

5. The image forming system according to claim 1,
wherein the first controller
obtains an authentication code for use in authentication when the image processing apparatus connects to a mobile communication system and an address of a management server that performs the authentication, and
by using the obtained authentication code and address, requests the management server to obtain connection information that is used when the image processing apparatus connects to the mobile communication system.

6. The image forming system according to claim 5, wherein the authentication code and the address are images that represent the authentication code and the address.

7. The image forming system according to claim 5, wherein the authentication code and the address are obtained by the first controller reading a two-dimensional code using a reading device and analyzing the read two-dimensional code.

8. The image forming system according to claim 7, wherein the reading device reads the two-dimensional code displayed on a screen of a cell phone.

9. The image forming system according to claim 7, wherein one of the following modes is selectable: a mode in which flow scanning of the two-dimensional code printed on a sheet is performed using an ADF; and a mode in which the two-dimensional code displayed on a screen of a cell phone is read.

10. The image forming system according to claim 5,
wherein the image processing apparatus comprises a plurality of nonvolatile memories, and
in response to the request, the management server stores the connection information, which is rewritable, in one nonvolatile memory out of the plurality of nonvolatile memories and stores the authentication code and the address in another out of the plurality of nonvolatile memories.

11. The image forming system according to claim 10, wherein the one nonvolatile memory is an eSIM module.

12. The image forming system according to claim 10, wherein in a case where the authentication performed in connecting the mobile communication system using the connection information stored in the one nonvolatile memory is unsuccessful, the first controller requests the management server to reobtain the connection information using the authentication code and the address stored in the another nonvolatile memory and stores the connection information reobtained in the one nonvolatile memory.

13. The image forming system according to claim 12, wherein the first controller displays a screen that prompts a user to input a password before the connection information is reobtained, and prohibits the connection information from being reobtained when the input password is not valid.

14. The image forming system according to claim 10, wherein
the connection information is stored in the another nonvolatile memory, and
in a case where the connection information stored in the one nonvolatile memory and the connection information stored in the another nonvolatile memory do not coincide with each other, the first controller deletes the connection information stored in the one nonvolatile memory.

15. The image forming system according to claim 10, wherein
a hash value in the connection information is stored in the another nonvolatile memory, and
the first controller generates a hash value from the connection information stored in the one nonvolatile memory, and deletes the connection information stored in the one nonvolatile memory in a case where the generated hash value and the hash value stored in the another nonvolatile memory do not coincide with each other.

16. The image forming system according to claim 15, wherein
the connection information includes a plurality of pieces of data, and
the hash value is obtained using a part or all of the plurality of pieces of data and a hash function.

17. The image forming system according to claim 3, wherein
the image processing apparatus comprises a connector to which a card storing the connection information and having a nonvolatile memory, which is not rewritable by the management server, is connected, and
in a case where the card has been removed from the connector without an operation to remove the card being received, the first controller performs control to turn on an illumination device and to print a warning.

18. The image forming system according to claim 10, wherein
the image processing apparatus comprises a connector to which a card storing the connection information and having a nonvolatile memory, which is not rewritable by the management server, is connected, and
in a case where the connection information stored in the nonvolatile memory that is not rewritable by the management server and the connection information stored in the another nonvolatile memory do not coincide with each other when the image forming apparatus is started, the first controller performs control to turn on an illumination device and to print a warning.

19. A control method for an image forming system comprising an image processing apparatus including a first millimeter wave communication interface and a second millimeter wave communication interface, and an image forming apparatus including a third millimeter wave communication interface and a fourth millimeter wave communication interface, the control method comprising:
outputting control information, which is used to carry out an image forming process in which the image forming apparatus forms an image on a sheet based on image data generated by the image processing apparatus, from the first millimeter wave communication interface and the second millimeter wave communication interface,
receiving the output control information via the third millimeter wave communication interface and the fourth millimeter wave communication interface, and
outputting response information, which is a response to the received control information, from the third millimeter wave communication interface and the fourth millimeter wave communication interface, and sending the response information to the image processing apparatus.

20. A non-transitory computer-readable storage medium storing a program for causing a computer to execute a control method for an image forming system comprising an image processing apparatus including a first millimeter wave communication interface and a second millimeter wave communication interface, and an image forming apparatus including a third millimeter wave communication interface and a fourth millimeter wave communication interface, the control method comprising:
outputting control information, which is used to carry out an image forming process in which the image forming apparatus forms an image on a sheet based on image data generated by the image processing apparatus, from the first millimeter wave communication interface and the second millimeter wave communication interface,
receiving the output control information via the third millimeter wave communication interface and the fourth millimeter wave communication interface, and
outputting response information, which is a response to the received control information, from the third millimeter wave communication interface and the fourth millimeter wave communication interface, and sending the response information to the image processing apparatus.

* * * * *